(12) United States Patent
Wang et al.

(10) Patent No.: US 12,252,093 B1
(45) Date of Patent: Mar. 18, 2025

(54) WEBBING HEIGHT ADJUSTING DEVICE

(71) Applicant: HORNLING INDUSTRIAL INC., Tainan (TW)

(72) Inventors: Liang-Hsiung Wang, Tainan (TW); Chia-Chun Chu, Tainan (TW)

(73) Assignee: HORNLING INDUSTRIAL INC., Tainan (TW)

( * ) Notice: Subject to any disclaimer, the term of this patent is extended or adjusted under 35 U.S.C. 154(b) by 0 days.

(21) Appl. No.: 18/743,143

(22) Filed: Jun. 14, 2024

(30) Foreign Application Priority Data

Sep. 14, 2023 (TW) ................... 112135102

(51) Int. Cl.
*B60R 22/20* (2006.01)
*B60R 22/28* (2006.01)

(52) U.S. Cl.
CPC .............. *B60R 22/20* (2013.01); *B60R 22/28* (2013.01); *B60R 2022/286* (2013.01)

(58) Field of Classification Search
CPC .... B60R 22/20; B60R 22/28; B60R 2022/286
See application file for complete search history.

(56) References Cited

U.S. PATENT DOCUMENTS

| | | | |
|---|---|---|---|
| 9,004,606 B2 | 4/2015 | Bostrom | |
| 10,011,245 B2* | 7/2018 | Wang | B60R 22/24 |
| 10,173,635 B2* | 1/2019 | Wang | B60R 22/20 |
| 10,654,442 B2* | 5/2020 | Wang | B60R 22/19 |
| 2004/0164602 A1 | 8/2004 | Furukawa | |
| 2018/0050657 A1* | 2/2018 | Wang | B60R 22/20 |

FOREIGN PATENT DOCUMENTS

| | | |
|---|---|---|
| CN | 1532095 A | 9/2004 |
| CN | 213473061 U | 6/2021 |
| CN | 217396472 U | 9/2022 |

* cited by examiner

*Primary Examiner* — Faye M Fleming
(74) *Attorney, Agent, or Firm* — WPAT, PC

(57) ABSTRACT

A webbing height adjusting device connected to a main webbing extending out from a webbing retractor of a seat belt system of a vehicle has a shock absorbing component and a webbing height adjusting unit. The shock absorbing component has a D-loop, a supplementary webbing, and an elastic element connected to the supplementary webbing for shock absorbing. The webbing height adjusting unit has an adjuster base, a slider, an elastic member, and an outer shell. The main webbing is mounted through the D-loop and the adjuster base; the supplementary webbing is mounted through the webbing height adjusting unit and clamped by the slider and the adjuster base pressed by the elastic member. The outer shell allows an operator to move the slider and the adjuster base relatively so as to unclamp the supplementary webbing and adjust the height of a top position formed by the webbing height adjusting unit.

40 Claims, 30 Drawing Sheets

WEBBING HEIGHT ADJUSTING DEVICE

BACKGROUND OF THE INVENTION

1. Field of the Invention

The present invention relates to a seat belt system in a vehicle, and particularly to a webbing height adjusting device that provides a main webbing of the seat belt system with an adjustable top position.

2. Description of Related Art

In a three-point seat belt system on a seat of vehicles such as cars, trucks, or sport utility vehicles (SUV) for protecting an occupant (e.g. a driver or a passenger), a webbing retractor is disposed on the inner side of a vehicle body near the seat, and a main webbing extends from the webbing retractor upward to be mounted through a D-loop on a top of a vehicle pillar of the vehicle body on a side of the seat; an end of the main webbing away from the webbing retractor is fixed on a bottom of the vehicle pillar. The occupant pulls the main webbing downward, obliquely places the main webbing in front of the shoulder and the chest of the occupant, and inserts a tongue mounted on the main webbing into a buckle on the other side of the seat away from the webbing retractor to allow a section of the main webbing between the tongue and the end of the main webbing to be laterally placed in front of the pelvis of the occupant, which forms the three-point seat belt system to secure the occupant on the seat.

In the three-point seat belt system, a section of the main webbing between the D-loop and the tongue obliquely placed and abutting the shoulder and the chest of the occupant needs a sufficient tension to secure the occupant, and the tension often causes discomfort of the occupant. Additionally, when the main webbing is tightly fastened, if the height of a top position for the main webbing near the shoulder of the occupant is unadjustable, in emergency, the neck of the occupant may be slashed by the main webbing. Thereby, a webbing height adjusting unit needs to be disposed near the D-loop on the vehicle pillar to allow the occupant to adjust the top position for the main webbing according to occupant's body shape, which ensures safety of the seat belt system in use. As safety of the occupant is highly regarded, the webbing height adjusting unit becomes a necessary safety device in the seat belt system.

A conventional webbing height adjusting unit for the main webbing in the seat belt system (as disclosed in the Webbing Adjustment Device of U.S. Pat. No. 10,654,442) has a guiding ring member, a frame, a slider movably connected to the frame, and a cover sheathed onto the frame. The guiding ring member is disposed above a side of the seat, and the main webbing from the webbing retractor is mounted through the frame or a connecting element connected to the frame and then mounted through the guiding ring member; the section of the main webbing between the guiding ring member and the tongue is mounted through a middle of the frame and the slider. A tension of the main webbing drives the frame and the slider to move relatively so as to tightly clamp and fasten the webbing, which forms the top position being height-adjustable for the vehicle occupant on the seat. When not in use, the webbing adjustment device can be hung on the guiding ring member by the cover sheathed onto the frame.

The conventional webbing adjustment device of the seat belt system described above is connected between a rear section of the main webbing (the section between the webbing retractor and the guiding ring member) and a front section of the main webbing abutting the shoulder and the chest of the occupant, which does allow the top position to be height-adjustable but cannot provide an auxiliary function of shock absorbing. Further, since the conventional webbing adjustment device passively clamps and fastens the main webbing by the tension of the main webbing, when the conventional webbing adjustment device is not in use, the conventional webbing adjustment device can easily shift and needs to be hung on the guiding ring member on the vehicle pillar. Hence, the occupant on the seat needs to readjust the height position of the conventional webbing adjustment device.

Moreover, to further improve the safety of the seat belt system in use, a shock absorbing component is applied in the conventional seat belt system of the vehicle on the base of a webbing height adjuster, providing the height-adjustable top position for the main webbing. The shock absorbing component is disposed on the vehicle pillar and is connected to the main webbing or further to the webbing height adjustment device so as to absorb shock for the occupant secured on the seat via an elastic member in the shock absorbing component.

A webbing height adjusting mechanism having both functions of height adjustment and shock absorbing mentioned above is disclosed in the Web Position Adjustment and Attenuation Apparatus of U.S. Pat. Nos. 9,499,121 and 9,738,248, the Shock Absorbing Webbing height adjusting units for Restraint Systems and Associated Systems and Methods of U.S. Pat. No. 9,809,193, the Webbing height adjusting units with Anti-cinch Features for Occupant Restraint Systems of U.S. patent Ser. No. 10/953,847 and U.S. Pat. No. 11,273,790 B2.

The Web Position Adjustment and Attenuation Apparatus of U.S. Pat. Nos. 9,499,121 and 9,738,248 disclose that the seat belt system includes a shock absorbing component and a web guide, wherein the shock absorbing component includes a supplementary webbing and an elastically deformable section on the supplementary webbing. The web coupling member is disposed above a side of the seat, and a bottom end of the supplementary webbing is connected to a bottom of a frame at a side of the seat. The supplementary webbing is mounted through the web guide, and an end of the supplementary webbing is connected to a web coupling member. In the seat belt system, the main webbing extending from the webbing retractor is mounted through the web coupling member and secures the occupant on the seat, and the elastically deformable section on the supplementary webbing is utilized for shock absorbing. However, in the configurations between the shock absorbing component and the main webbing described above, a top position formed by the web coupling member can only be adjusted in a limited range via the limited deformation of the elastically deformable section on the supplementary webbing, which is not substantially height-adjustable.

The Web Position Adjustment and Attenuation Apparatus of U.S. Pat. Nos. 9,499,121 and 9,738,248 further disclose a webbing adjusting device having an elongated body and a web coupling member. The elongated body is elastically deformable, and the web coupling member is disposed on the elongated body, is movable to be repositioned along the elongated body vertically, and is a multi-stage height adjusting mechanism. In the seat belt system of the vehicle, the main webbing extending from the webbing retractor is mounted through the web guide and then mounted through the web coupling member, and the web coupling member is configured to adjust the top position between several positions designed previously on the elongated body. Further, the elongated body being elastically deformable is configured for shock absorbing.

The Shock Absorbing Webbing height adjusting units for Restraint Systems and Associated Systems and Methods of U.S. Pat. No. 9,809,193 disclose a shock absorbing webbing height adjusting unit including a rail disposed on the vehicle pillar, a D-loop assembly slidably coupled to the rail, and a stop assembly and a pre-loader both slidably coupled to the rail. The stop assembly is configured to be releasably lockable at a plurality of positions along the rail at a side of the D-loop assembly, and the pre-loader is also configured to be releasably lockable at a plurality of positions along the rail to pre-compress a spring such that the spring biases the D-loop assembly against the stop assembly. The web extending from the webbing retractor is first mounted through the D-loop assembly and extends downward to be connected to a side of the seat. A height position of the D-loop assembly on the rail can be adjusted by sliding and relocking the stop assembly (function of providing an adjustable top position); the pre-loader and the spring being elastic allow the D-loop assembly to move away from the stop assembly due to the tension of the web mounted through the D-loop assembly, which provides the function of shock absorbing.

The Webbing height adjusting units with Anti-cinch Features for Occupant Restraint Systems of U.S. patent Ser. No. 10/953,847 and U.S. Pat. No. 11,273,790 B2 disclose a webbing height adjusting unit including an upper anchor fixed on the vehicle pillar, an anti-cinch feature connected to the upper anchor, and a webbing height adjusting unit disposed below the anti-cinch feature. The webbing height adjusting unit has a web aperture being height-adjustable, and the main webbing extending from the webbing retractor is first mounted through the web aperture of the webbing height adjusting unit and then extends downward to be connected to a side of the seat. The anti-cinch feature between the vehicle pillar and the web aperture is elastic and provides the function of shock-absorbing.

In these webbing height adjusting mechanisms mentioned above, the mechanisms connected to the main webbing are configured to adjust the height of the top position, allow the main webbing mounted through the webbing height adjusting unit to be pulled freely, and provide the function of shock absorbing for the main webbing via the elastically deformable section on the supplementary webbing (elongated body being elastic/pre-loader and spring/anti-cinch feature being elastic). However, when the occupant tries to adjust the height position of the web coupling member (D-loop assembly/web aperture) after the web is fastened, the web coupling member (stop assembly/web aperture) needs to be unlocked first, which causes inconvenience of operation in use.

To overcome the shortcomings of the conventional webbing height adjusting mechanisms mentioned above, the present invention tends to provide a webbing height adjusting device to mitigate or obviate the aforementioned problems.

SUMMARY OF THE INVENTION

The main objective of the present invention is to provide a webbing height adjusting device that improves the convenience of operation in use.

The webbing height adjusting device provided by the present invention is adapted to be connected to a main webbing extending out from a webbing retractor of a seat belt system of a vehicle. The webbing height adjusting device has a shock absorbing component and a webbing height adjusting unit. The shock absorbing component has a D-loop, a supplementary webbing, and at least one elastic element. The D-loop is configured to be connected to an upper position in the vehicle, is configured for the main webbing to be mounted therethrough, and thereby divides the main webbing to a rear section and a front section. The supplementary webbing is configured to be located between the rear section and the front section of the main webbing and has a top end, a bottom end, and at least one flexible section. The top end is connected to the D-loop, and the bottom end is opposite to the top end and is configured to be connected to a lower position in the vehicle. Said elastic element is located beside said flexible section and has two opposite ends fixed to two opposite ends of said flexible section respectively. The webbing height adjusting unit is disposed below the D-loop, is configured to be connected to the front section of the main webbing and the supplementary webbing to form an adjustable top position, and has an adjuster base, a slider, an elastic member, and an outer shell. The adjuster base has a frame, a webbing-abutting portion, a sliding space, a webbing-mounting portion, and a main webbing slot. The webbing-abutting portion is formed on an upper section of the frame, and the sliding space is formed between the webbing-abutting portion and the frame. The webbing-mounting portion is formed on a lower section of the frame, the main webbing slot is formed in the webbing-mounting portion and the frame and is configured for the front section of the main webbing to be mounted therethrough. The slider is mounted in the sliding space of the adjuster base, is configured to move up and down, and has an inclined slot configured for the supplementary webbing to be mounted therethrough. The elastic member is disposed between the slider and the adjuster base and is configured to provide a restoring force to allow the slider and the webbing-abutting portion of the adjuster base to clamp the supplementary webbing. The outer shell is mounted on the adjuster base, is configured to move up and down relative to the adjuster base, and is operable to actuate the slider and the adjuster base to move relatively so as to unclamp the supplementary webbing. When the outer shell is released, the restoring force provided by the elastic member pushes the slider and the adjuster base to move relatively and re-clamp the supplementary webbing.

For the webbing height adjusting device as described above, the supplementary webbing has one said flexible section located at a lower section of the supplementary webbing, and the at least one elastic element is located on one of two opposite sides or each one of the two opposite sides of the flexible section.

For the webbing height adjusting device as described above, the supplementary webbing has two said flexible sections located at an upper section and a lower section of the supplementary webbing, respectively, and each one of the two flexible sections has at least one said elastic element located on one of two opposite sides or each one of the two opposite sides of said flexible section.

Another webbing height adjusting device provided by the present invention has a shock absorbing component and a webbing height adjusting unit. The shock absorbing component has a D-loop, a supplementary webbing, and an elastic element. The D-loop is configured to be connected to an upper position in the vehicle, is configured for the main webbing to be mounted therethrough, and thereby divides the main webbing to a rear section and a front section. The supplementary webbing has a top end connected to the D-loop and a bottom end being opposite to the top end. The elastic element is connected to the bottom end of the supplementary webbing and has a bottom configured to be connected to a lower position in the vehicle. The webbing height adjusting unit is disposed below the D-loop, is configured to be connected to the front section of the main webbing and the supplementary webbing to form an adjustable top position, and has an adjuster base, a slider, an elastic member, and an outer shell. The adjuster base has a frame, a webbing-abutting portion, a sliding space, a webbing-mounting portion, and a main webbing slot. The webbing-abutting portion is formed on an upper section of the frame, and the sliding space is formed between the webbing-abutting portion and the frame. The webbing-mounting portion is formed on a lower section of the frame, the main webbing slot is formed in the webbing-mounting portion and the frame and is configured for the front section of the main webbing to be mounted therethrough. The slider is mounted in the sliding space of the adjuster base, is configured to move up and down, and has an inclined slot configured for the supplementary webbing to be mounted therethrough. The elastic member is disposed between the slider and the adjuster base and is configured to provide a restoring force to allow the slider and the webbing-abutting portion of the adjuster base to clamp the supplementary webbing. The outer shell is mounted on the adjuster base, is configured to move up and down relative to the adjuster base, and is operable to actuate the slider and the adjuster base to move relatively so as to unclamp the supplementary webbing. When the outer shell is released, the restoring force provided by the elastic member pushes the slider and the adjuster base to move relatively and re-clamp the supplementary webbing.

Still another webbing height adjusting device provided by the present invention has a shock absorbing component and a webbing height adjusting unit. The shock absorbing component has a D-loop, a supplementary webbing, and two elastic elements. The D-loop is configured to be connected to an upper position in the vehicle, is configured for the main webbing to be mounted therethrough, and thereby divides the main webbing to a rear section and a front section. The supplementary webbing has a top end and a bottom end opposite to each other. One of the two elastic elements is connected to the D-loop and the top end of the supplementary webbing, and the other one of the two elastic elements is connected to the bottom end of the supplementary webbing and is configured to be connected to a lower position in the vehicle. The webbing height adjusting unit is disposed below the D-loop, is configured to be connected to the front section of the main webbing and the supplementary webbing to form an adjustable top position, and has an adjuster base, a slider, an elastic member, and an outer shell. The adjuster base has a frame, a webbing-abutting portion, a sliding space, a webbing-mounting portion, and a main webbing slot. The webbing-abutting portion is formed on an upper section of the frame, and the sliding space is formed between the webbing-abutting portion and the frame. The webbing-mounting portion is formed on a lower section of the frame, the main webbing slot is formed in the webbing-mounting portion and the frame and is configured for the front section of the main webbing to be mounted therethrough. The slider is mounted in the sliding space of the adjuster base, is configured to move up and down, and has an inclined slot configured for the supplementary webbing to be mounted therethrough. The elastic member is disposed between the slider and the adjuster base and is configured to provide a restoring force to allow the slider and the webbing-abutting portion of the adjuster base to clamp the supplementary webbing. The outer shell is mounted on the adjuster base, is configured to move up and down relative to the adjuster base, and is operable to actuate the slider and the adjuster base to move relatively so as to unclamp the supplementary webbing. When the outer shell is released, the restoring force provided by the elastic member pushes the slider and the adjuster base to move relatively and re-clamp the supplementary webbing.

For the webbing height adjusting device as described above, the outer shell has an operation space formed on an upper section of an interior of the outer shell and two abutting portions located below two opposite sides of the operation space respectively; the webbing-abutting portion of the adjuster base is configured to move up and down in the operation space and is located above the two abutting portions; the outer shell is configured to be pulled upward and to push the webbing-abutting portion of the adjuster base via the two abutting portions to actuate the adjuster base and the slider to move relatively; the outer shell is operable to move downward, to abut the slider, and to allow the adjuster base and the slider to move relatively.

For the webbing height adjusting device as described above, the adjuster base has two opposite sides being a first side and a second side respectively; the second side of the adjuster base is configured to face the rear section of the main webbing; the adjuster base is configured for the front section of the main webbing and the supplementary webbing to extend thereinto from the first side of the adjuster base and to extend thereout from the second side of the adjuster base; an end of the webbing-abutting portion near the sliding space forms a webbing-abutting end; the slider has a first side board and a second side board arranged at a spaced interval and located at the first side and the second side of the adjuster base, respectively; the slider has two connecting portions formed between the first side board and the second side board and located through the sliding space of the adjuster base; the inclined slot inclinedly extends between the two connecting portions along a direction from an end of the first side board near the webbing-abutting portion toward an end of the second side board near the webbing-mounting portion; a top end of the second side board is located higher than a top end of the first side board and a top opening of the inclined slot; the first side board has a clamping surface formed on an end of the first side board near the inclined slot and configured to clamp the supplementary webbing with the webbing-abutting end of the webbing-abutting portion.

For the webbing height adjusting device as described above, the frame has a through hole and a connecting hole located below the through hole; the webbing-abutting portion is formed to cover the upper section of the frame and extends to a top end of the through hole; the sliding space is formed between an edge of the through hole and the webbing-abutting portion; the webbing-mounting portion is formed to cover the lower section of the frame and covers the connecting hole to form the main webbing slot.

For the webbing height adjusting device as described above, the webbing-mounting portion has an abutting surface formed on a top of the webbing-mounting portion and a position-limiting post protruding from the abutting surface and laterally extending toward the frame to form a gap between the position-limiting post and the abutting surface; the elastic member is an arc-shaped flat spring and has a middle portion and two end portions; the middle portion is disposed in the gap between the position-limiting post and the abutting surface; the two end portions are connected to the middle portion and abut a bottom of the first side board of the slider.

For the webbing height adjusting device as described above, the outer shell has a first plate portion located beside the second side of the adjuster base and abutting against a top of the second side board of the slider, a second plate portion located beside the first side of the adjuster base, a top side wall, and a webbing-mounting space formed between the second plate portion and the top side wall and communicating with the sliding space from the first side of the adjuster base; the top side wall is connected to a top end of the first plate portion, is located beside the webbing-abutting portion of the adjuster base, is located above the operation space, and has a side surface facing the operation space; an operation gap is formed between the side surface of the top side wall and the webbing-abutting portion.

For the webbing height adjusting device as described above, the outer shell has two side walls and a receiving groove; the two side walls are located on two opposite sides of the outer shell respectively and connected to the second plate portion and the first plate portion, and each one of the two side walls having a slip-proof surface on its periphery; the receiving groove is formed by the first plate portion and the two side walls and configured for the second side board of the slider to be inserted thereinto.

For the webbing height adjusting device as described above, the outer shell has a bridge portion connected to the second plate portion and forming a space between the bridge portion and the second plate portion; the main webbing is mounted through the space between the bridge portion and the second plate portion and then mounted through the main webbing slot of the adjuster base.

By means of the aforementioned technical features, the webbing height adjusting device of the present invention applied in the three-point seat belt system provides efficacy as follows:

1. providing an adjustable top position for the main webbing: the webbing height adjusting device of the present invention has the webbing height adjusting unit and the shock absorbing component disposed in the vehicle and connected to each other, and the webbing height adjusting unit is connected to the main webbing and the supplementary webbing of the shock absorbing component. The webbing height adjusting unit forms the top position and allows the occupant to manually adjust the height of the top position.

2. providing utility of shock absorbing for the occupant on the seat: the webbing height adjusting device of the present invention has the shock absorbing component, and a top end and a bottom end of the shock absorbing component are connected to the upper position and the lower position of the vehicle beside the seat, respectively. The D-loop on a top of the shock absorbing component is configured for the main webbing to be mounted therethrough. The webbing height adjusting unit is connected to the main webbing of the seat belt system and the supplementary webbing of the shock absorbing component. The supplementary webbing connected to the elastic element allows the main webbing securing the occupant on the seat to have utility of shock absorbing via the connection of the webbing height adjusting unit.

3. providing efficacy of auto-clamping and stable positioning: in the webbing height adjusting device in the present invention, the slider and the webbing-abutting portion of the adjuster base clamp the supplementary webbing via the restoring force of the elastic member. By the elastic member continuously providing the restoring force toward the slider, the webbing height adjusting unit is assured to automatically clamp and be positioned on the supplementary webbing. When the occupant sits on the seat and fastens the main webbing correctly, the supplementary webbing under the D-loop is mounted through a middle of the webbing-abutting portion and the slider from the first side to the second side of the adjuster base, and the elastic member pushes the slider and the webbing-abutting portion to clamp the supplementary webbing. The front section of the main webbing is mounted through the main webbing slot from the first side to the second side of the adjuster base, is redirected by the webbing-mounting portion, and then secures the occupant's body on the seat. A retracting force of the webbing retractor acted on the main webbing increases the tension of the main webbing, and the main webbing increases a tension of the supplementary webbing via the webbing height adjusting unit. On the basis of the webbing height adjusting unit initiatively clamps the supplementary webbing, as the tension of the supplementary webbing increases, a clamping force applied on the supplementary webbing by the adjuster base and the slider can thus be improved to provide a better effect of positioning.

4. convenient and easy in operation: the webbing height adjusting unit in the present invention connected to the main webbing and the supplementary webbing forms the top position above a side of the occupant on the seat. When adjusting the height position of the webbing height adjusting unit, the occupant only needs to hold the outer shell to push the slider or act a force on the adjuster base so as to drive the slider and the adjuster base to overcome the restoring force of the elastic member and move relatively, which easily allows the webbing height adjusting unit to unclamp the supplementary webbing and to move along the supplementary webbing and the main webbing for adjusting its height position. Thereby, the webbing height adjusting unit applied in the three-point seat belt system is simple and convenient in operation for the occupant on the seat.

5. utility of stepless adjustment of the webbing height adjusting unit's height position: the webbing height adjusting unit in the present invention is connected to the main webbing and the supplementary webbing; specifically, the slider and the webbing-abutting portion of the adjuster base clamp the supplementary webbing under the restoring force of the elastic member, and the main webbing is movably mounted through the main webbing slot on a bottom of the adjuster base. Thereby, the webbing height adjusting unit allows the occupant to freely adjust the height position of the webbing height adjusting unit and thus has the utility of stepless adjustment.

6. minimizing the possibility of the webbing height adjusting unit changing its location when the occupant is secured: as described above, in the webbing height adjusting unit, the slider and the webbing-abutting portion of the adjuster base passively clamp the supplementary webbing under the restoring force of the elastic member, and the main webbing in the seat belt system is movably mounted through the main webbing slot on a bottom of the adjuster base. Thereby, when the occupant fastens the main webbing correctly, the webbing height adjusting unit clamps the supplementary webbing more tightly under a tension of the supplementary webbing such that the webbing height adjusting unit is fixed at a position. Moreover, a clamping force acted by the webbing height adjusting unit on the supplementary webbing is in a positive correlation with the tension on the main webbing and minimizes the possibility of changing its location.

7. no need for readjusting the position of the webbing height adjusting unit when a same occupant sitting on the seat: as described above, the slider and the webbing-abutting portion of the adjuster base in the webbing height adjusting unit clamp the supplementary webbing under the restoring force of the elastic member, and the main webbing is movably mounted through the main webbing slot of the adjuster base. When the occupant leaves the seat, the main webbing is automatically retracted by the webbing retractor, and a position of the webbing height adjusting unit on the supplementary webbing remains unchanged. Thereby, after adjusting the position of the webbing height adjusting unit, if no other occupant changes the position of the webbing height adjusting unit, the original occupant needs not readjust the position of the webbing height adjusting unit after backing to the seat.

Further, in the webbing height adjusting device of the present invention, the outer shell may have a bridge portion connected to the second plate portion. The main webbing is mounted through a space between the bridge portion and the second plate portion and then mounted through the main webbing slot of the adjuster base. The bridge portion is utilized to guide the direction of the main webbing near the webbing height adjusting unit.

DETAILED DESCRIPTION OF THE PREFERRED EMBODIMENT

With reference to FIGS. 1, 2, 4, and 5, several embodiments of a webbing height adjusting device in accordance with the present invention applied in a seat belt system 1 of a seat in a vehicle are shown. The seat belt system 1 has a webbing retractor 1B located at a side of the seat near a vehicle pillar of the vehicle and a main webbing 1A extending from the webbing retractor 1B. The main webbing 1A is flexible but unable to deform elastically, and the webbing retractor 1B is configured to automatically retract the main webbing 1A therein. An end of the main webbing 1A away from the webbing retractor 1B is fixed on a bottom of the vehicle pillar. The seat belt system 1 has a tongue 1C attached to the main webbing 1A and configured to be detachably connected to a buckle 1D of the seat belt system 1 at the other side of the seat (i.e., the side away from the vehicle pillar). The seat belt system 1 is conventional, and thus other specific configurations thereof are not described here.

With reference to FIGS. 1, 2, 4, and 5, the webbing height adjusting device of the present invention is adapted to be connected to the main webbing 1A. The webbing height adjusting device has a shock absorbing component 2 and a webbing height adjusting unit 3. Specific configurations of the shock absorbing component 2 and the webbing height adjusting unit 3 are described below respectively.

With reference to FIGS. 1, 2, 4, and 5, a top end and a bottom end of the shock absorbing component 2 are fixed at a side of the seat adjacent to the vehicle pillar in the vehicle. In the embodiments disclosed in the above-mentioned figures, the top end and the bottom end of the shock absorbing component 2 are fixed on an upper position and a lower position on the vehicle pillar, respectively, but positions of the shock absorbing component 2 connected to a vehicle body are not limited to the above disclosure.

Basically, the shock absorbing component 2 has a supplementary webbing 2A, at least one elastic element 2B, and a D-loop 2C. Said elastic element 2B is connected to the supplementary webbing 2A. The D-loop 2C is located on the top of the shock absorbing component 2 and is connected to said elastic element 2B or the supplementary webbing 2A, and the D-loop 2C is configured for the main webbing 1A to be mounted therethrough. The supplementary webbing 2A is flexible but unable to deform elastically, and the elastic element 2B is configured to deform elastically (e.g. an elastic strap) and is configured to provide a function of shock absorbing. The D-loop 2C is made of a rigid material (e.g. Ferrous metals or other materials) and has sufficient strength to support the main webbing 1A, the supplementary webbing 2A, and said elastic element 2B. Details are described according to the embodiments in FIGS. 1, 2, 4, and 5 respectively.

Figure 1:
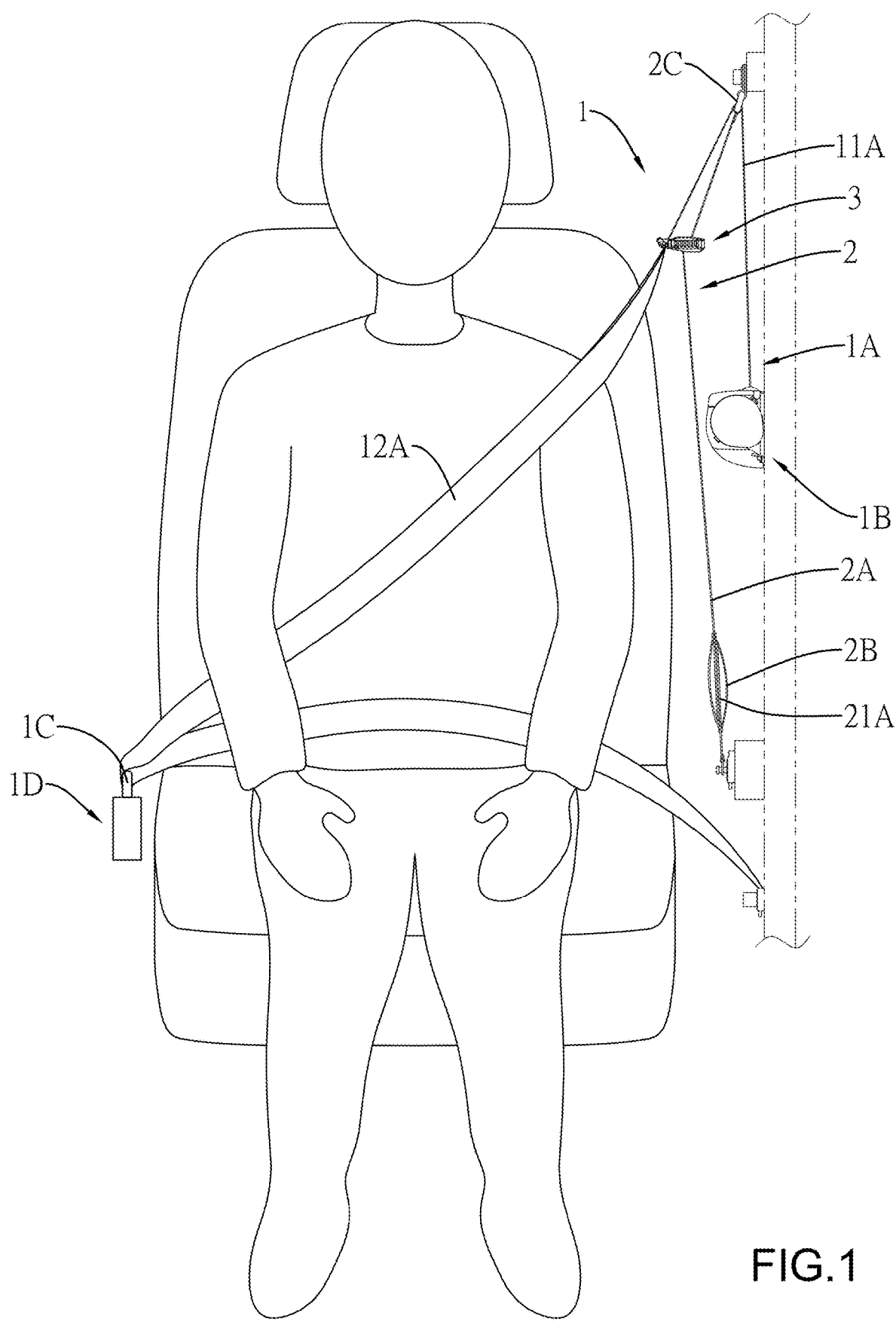
FIG. 1 depicts a first preferred embodiment of a webbing height adjusting device in accordance with the present invention applied in a seat belt system.
Figure 2:
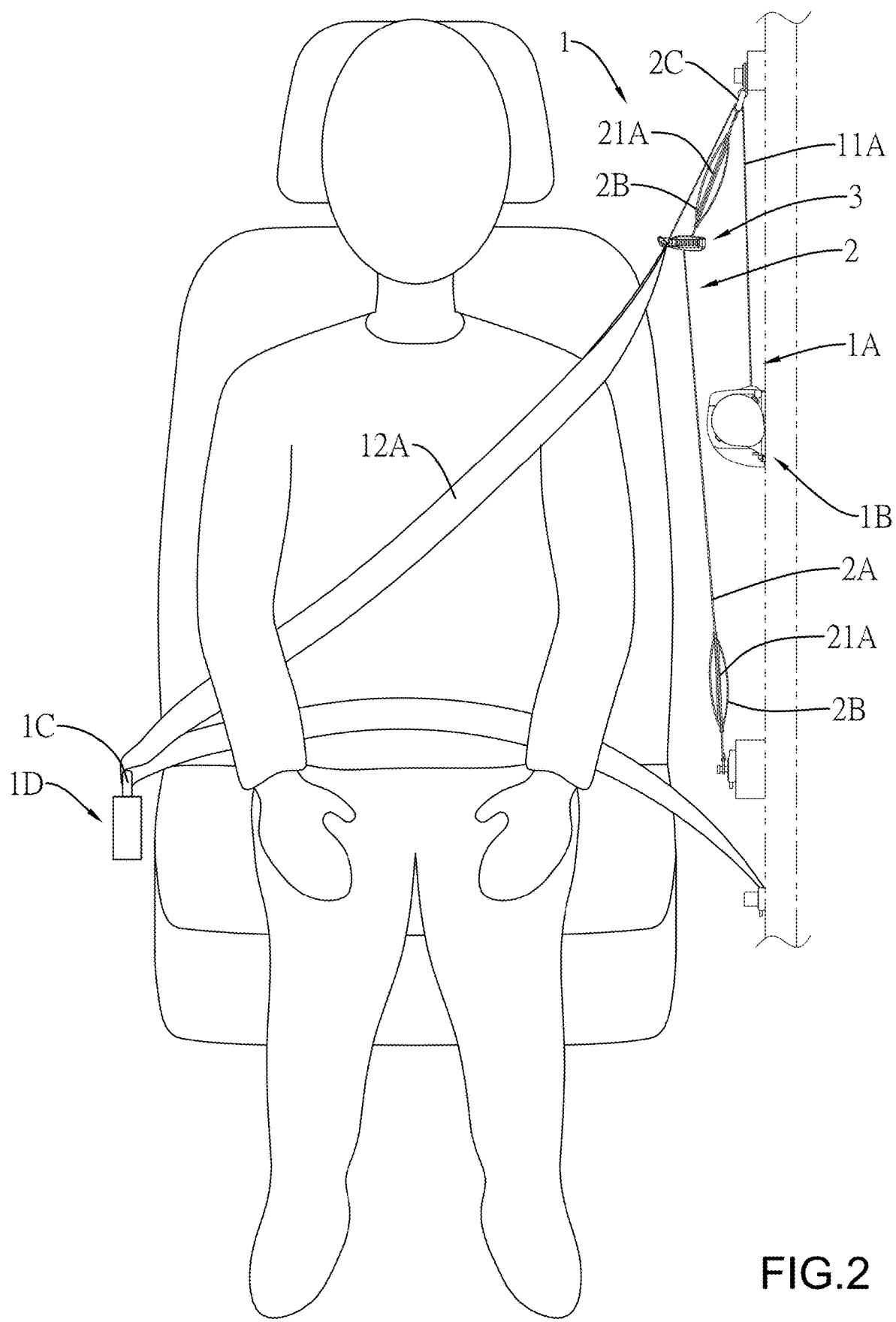
FIG. 2 depicts a second preferred embodiment of the webbing height adjusting device in accordance with the present invention applied in a seat belt system.

With reference to FIGS. 1 and 2, in the shock absorbing component 2 of a first and a second preferred embodiment of the webbing height adjusting device, a top end of the supplementary webbing 2A is connected to the D-loop 2C, and the D-loop 2C is connected to the upper position on the vehicle pillar; a bottom end of the supplementary webbing 2A is fixedly connected to the lower position on the vehicle pillar. The supplementary webbing 2A has at least one flexible section 21A, and at least one said elastic element 2B is disposed on one of two opposite sides or each one of the two opposite sides of said flexible section 21A. Two opposite ends of said elastic elements 2B are connected to two opposite ends of said flexible section 21A respectively. Number and position of said flexible section 21A can be decided according to product demands.

Figure 3A:
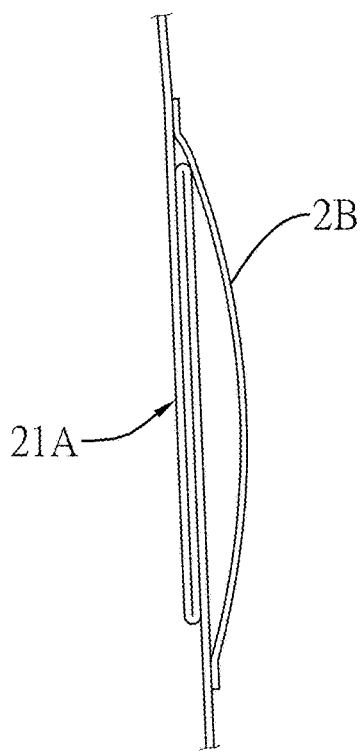
FIGS. 3A to 3D depict a supplementary webbing and elastic element(s) in different embodiments of the webbing height adjusting device.
Figure 3B:
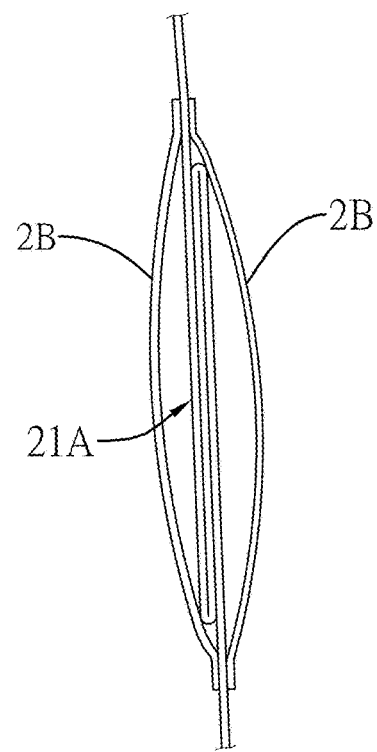

With reference to FIGS. 1 and 3B, in the first preferred embodiment, the supplementary webbing 2A has one said flexible section 21A at its lower section, and the shock absorbing component 2 has two said elastic elements 2B disposed on the two opposite sides of the flexible section 21A respectively. With reference to FIGS. 2 and 3B, in the second preferred embodiment, the supplementary webbing 2A has two said flexible sections 21A located at its upper section and lower section respectively; the shock absorbing component 2 has two pairs of said elastic elements 2B, and each pair of said elastic elements 2B is disposed on two opposite sides of a respective one of the two flexible sections 21A. The D-loop 2C is configured for the main webbing 1A to be mounted therethrough; thereby, when a force is applied on the supplementary webbing 2A, said flexible section 21A is stretched and actuates said elastic elements 2B to elastically deform and cancel out a part of the force applied on the supplementary webbing 2A, which allows the shock absorbing component 2 to provide a function of shock absorbing.

Figure 3C:
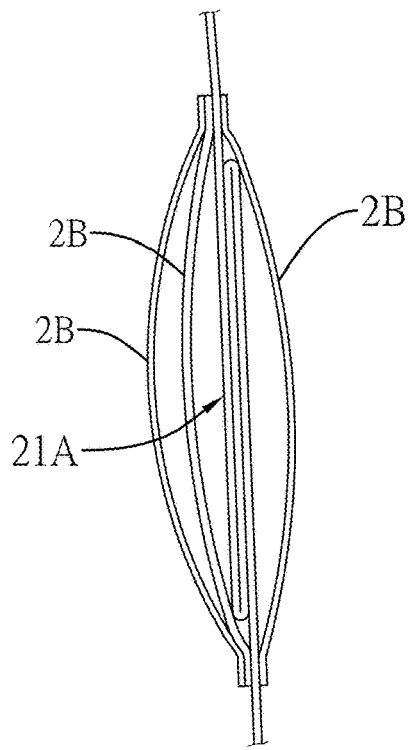
Figure 3D:
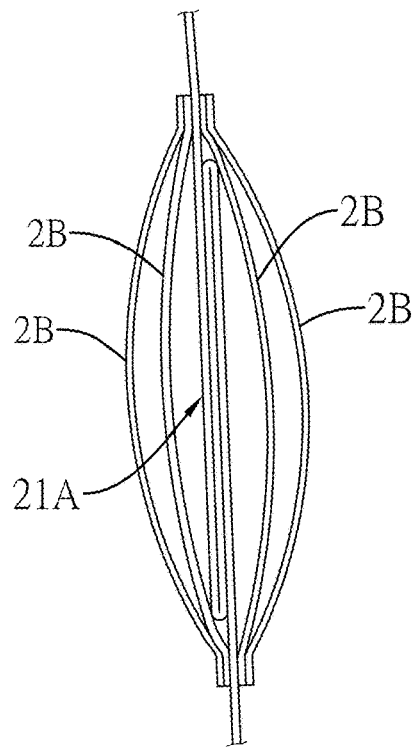

With reference to FIG. 3A, in other embodiments, the shock absorbing component 2 may have one said elastic element 2B disposed on one of the two opposite sides of said flexible section 21A. With reference to FIG. 3C, in still other embodiments, the shock absorbing component 2 may have one said elastic element 2B disposed on one of the two opposite sides of said flexible section 21A and two said elastic elements 2B disposed on the other one of the two opposite sides of the corresponding flexible section 21A. With reference to FIG. 3D, in still other embodiments, the shock absorbing component 2 may have two said elastic elements 2B disposed on each one of the two opposite sides of said flexible section 21A. Each one of the embodiments mentioned above is able to provide the function of shock absorbing.

Figure 4:
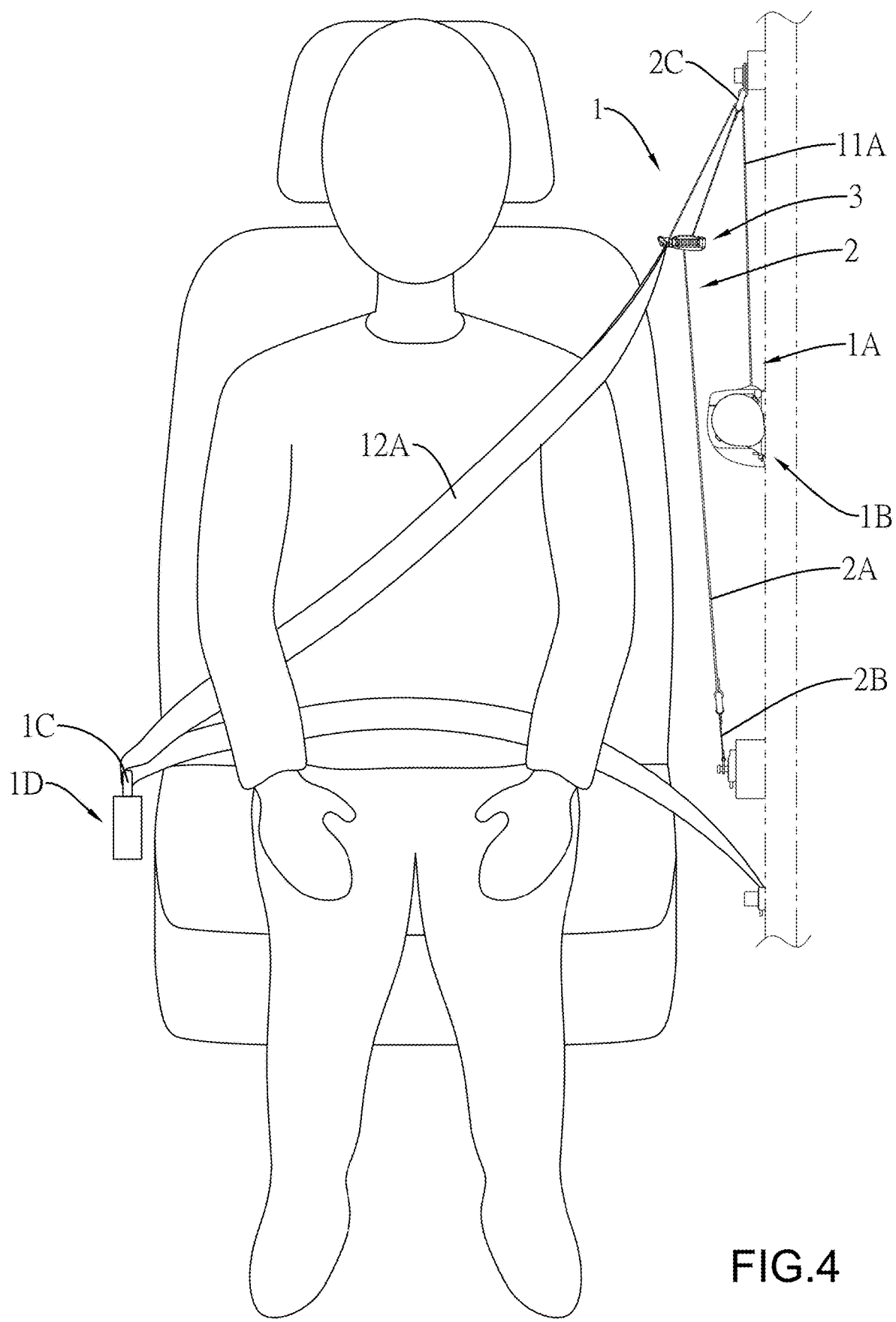
FIG. 4 depicts a third preferred embodiment of the webbing height adjusting device in accordance with the present invention applied in a seat belt system.

With reference to FIG. 4, in the third preferred embodiment, the shock absorbing component 2 has the supplementary webbing 2A, one said elastic element 2B, and the D-loop 2C. The top end of the supplementary webbing 2A is connected to the D-loop 2C, and the D-loop 2C is connected to the upper position on the vehicle pillar. The two opposite ends of the elastic element 2B are connected to the bottom end of the supplementary webbing 2A and fixedly connected to the lower position on the vehicle pillar respectively. The D-loop 2C is configured for the main webbing 1A to be mounted therethrough; thereby, when a force is applied on the supplementary webbing 2A, the elastic element 2B is pulled to deform and cancel out a part of the force applied on the supplementary webbing 2A, which allows the shock absorbing component 2 to provide the function of shock absorbing. In the third preferred embodiment, the supplementary webbing 2A and the elastic element 2B can be connected to each other via sewing or a connecting ring.

Figure 5:
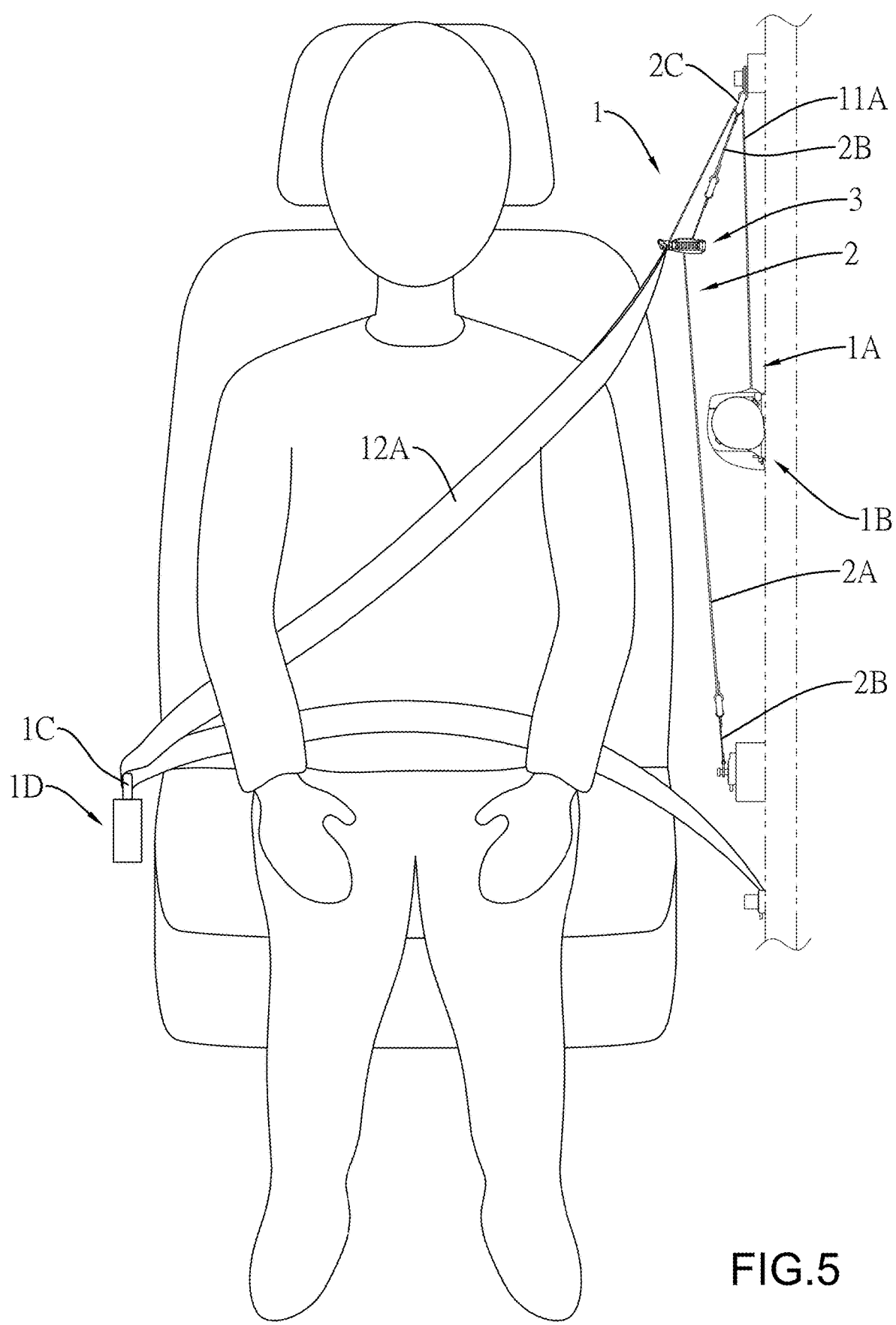
FIG. 5 depicts a fourth preferred embodiment of the webbing height adjusting device in accordance with the present invention applied in a seat belt system.

With reference to FIG. 5, in the fourth preferred embodiment, the shock absorbing component 2 has the supplementary webbing 2A, two said elastic elements 2B, and the D-loop 2C. The two elastic elements 2B are connected to the top end and the bottom end of the supplementary webbing 2A, respectively. One of the two elastic elements 2B is connected to the D-loop 2C connected to the upper position on the vehicle pillar, and the other one of the two elastic elements 2B is fixedly connected to the lower position on the vehicle pillar. The D-loop 2C is configured for the main webbing 1A to be mounted therethrough; thereby, when a force is applied on the supplementary webbing 2A, the two elastic elements 2B are pulled to deform and cancel out a part of the force applied on the supplementary webbing 2A, which allows the shock absorbing component 2 to provide the function of shock absorbing. In the fourth preferred embodiment, the supplementary webbing 2A and the elastic element 2B can be connected via sewing or a connecting ring.

In each one of the embodiments mentioned above in FIGS. 1, 2, 4, and 5, the main webbing 1A is mounted through the D-loop 2C to have a rear section 11A and a front section 12A divided by the D-loop 2C. The front section 12A is configured to be obliquely placed in front of the occupant and secure the occupant on the seat. The shock absorbing component 2 is located between the rear section 11A and the front section 12A of the main webbing 1A.

With reference to FIGS. 6 to 10, the webbing height adjusting unit 3 is disposed below the D-loop 2C and is connected to the front section 12A of the main webbing 1A and the supplementary webbing 2A to form an adjustable top position. The webbing height adjusting unit 3 has an adjuster base 30, a slider 40, an elastic member 50, and an outer shell 60. Details of each of the components of the webbing height adjusting unit 3 are described below.

Figure 11:
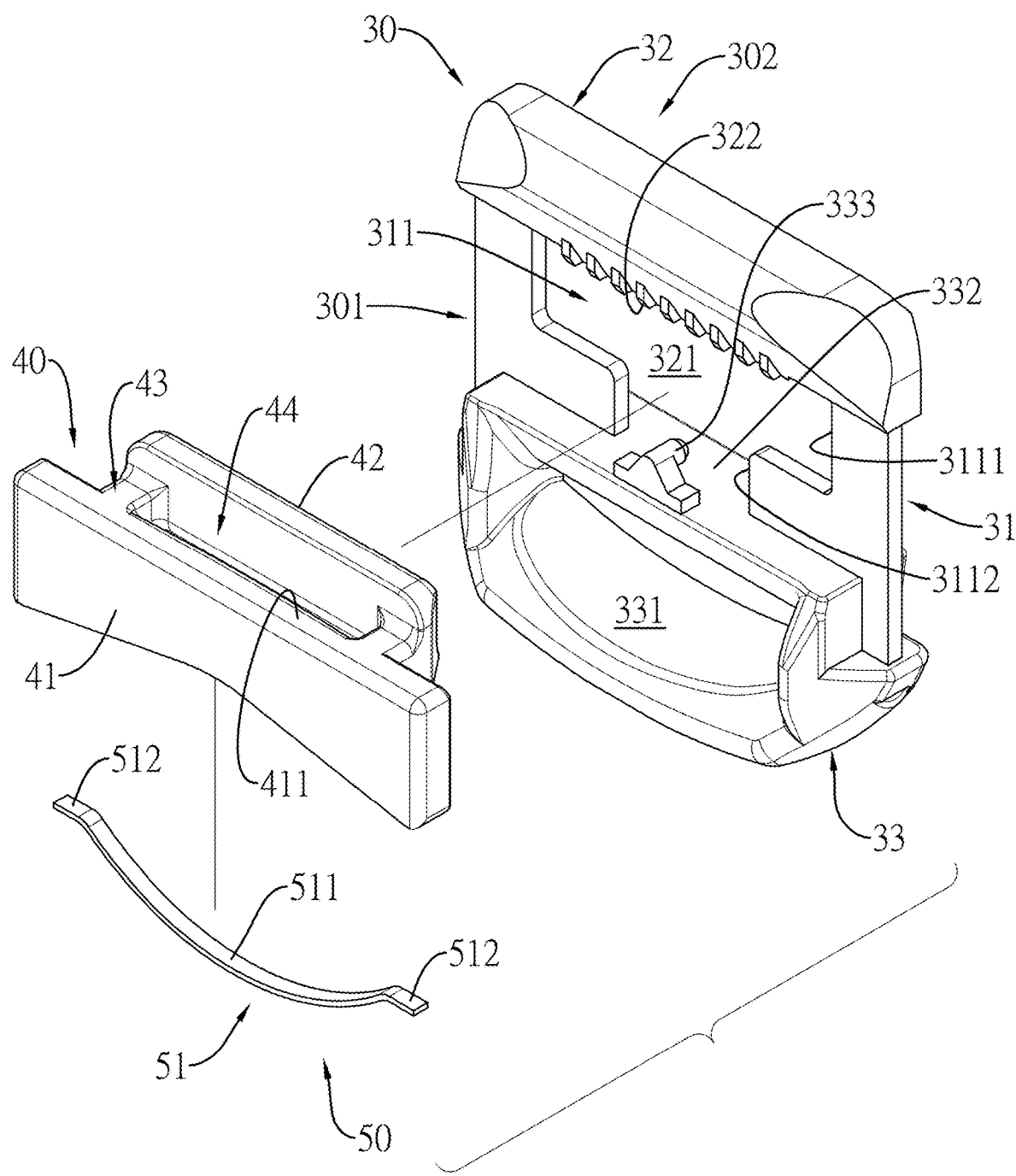
FIG. 11 is an exploded perspective view of an adjuster base, a slider, and an elastic member of the webbing height adjusting unit in FIGS. 6, 7, 9, and 10.
Figure 12:
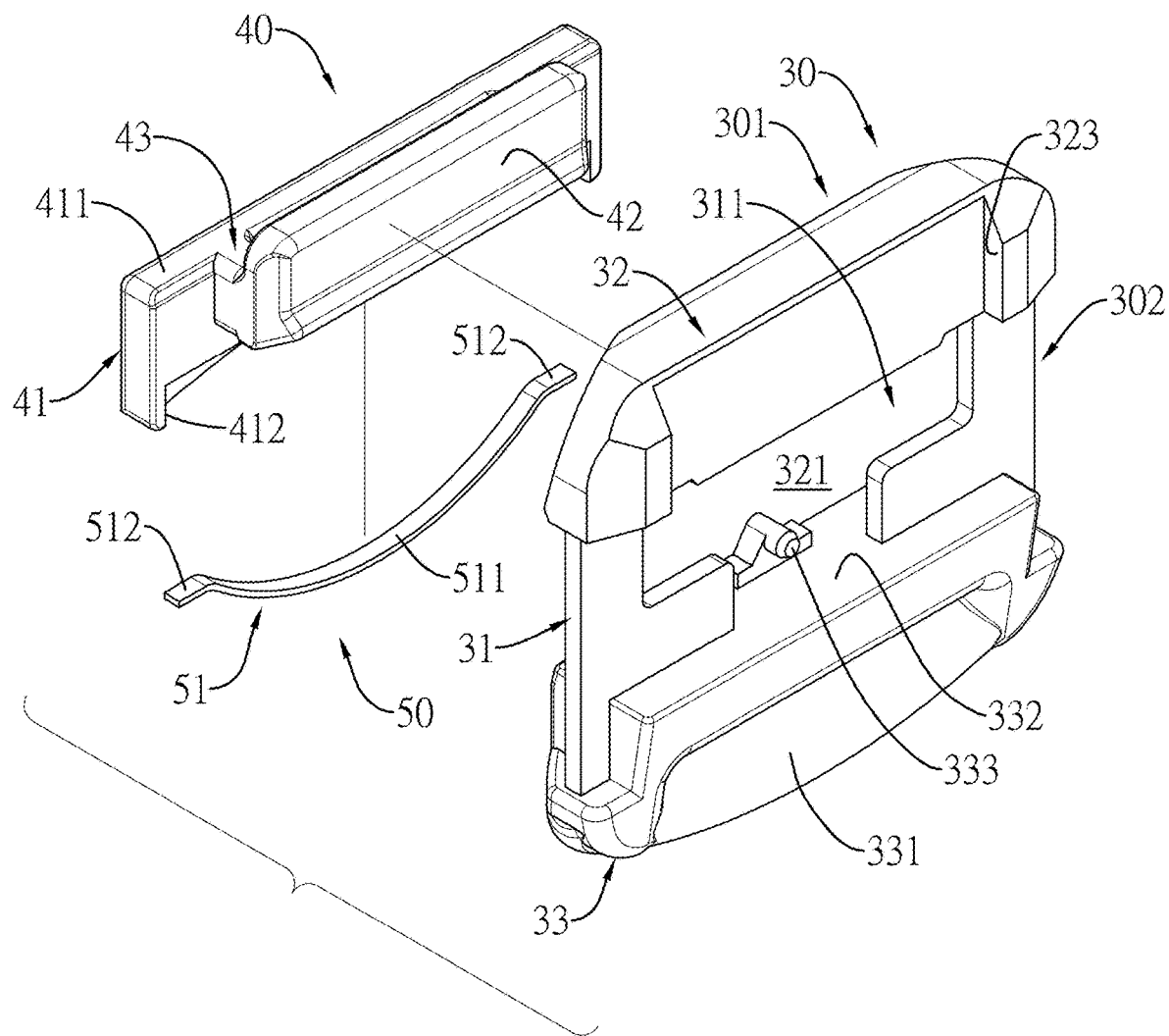
FIG. 12 is another exploded perspective view of the adjuster base, the slider, and the elastic member of the webbing height adjusting unit in FIGS. 6, 7, 9, and 10.
Figure 13:
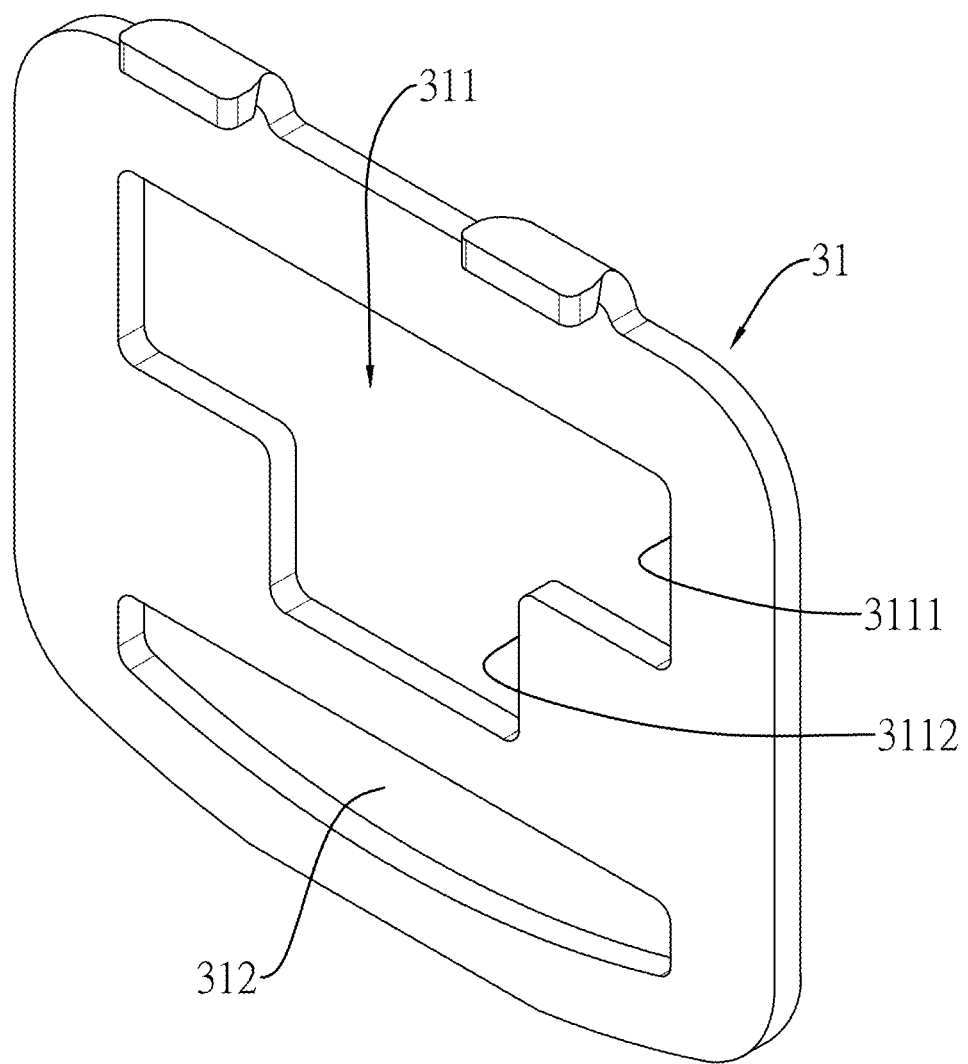
FIG. 13 is a perspective view of a frame of the adjuster base in FIGS. 6 to 12.

With reference to FIGS. 11 to 13, the adjuster base 30 has a frame 31, a webbing-abutting portion 32, and a webbing-mounting portion 33. Two opposite sides of the adjuster base 30 are defined as a first side 301 and a second side 302 respectively. The frame 31 may adopt a component made of a rigid material (e.g. Ferrous metals or other materials). The frame 31 has a through hole 311 and a connecting hole 312 located below the through hole 311; in the preferred embodiments, the through hole 311 has a base section 3111 and an extending section 3112 extending downward from the base section 3111, and a width of the base section 3111 is larger than that of the extending section 3112.

With reference to FIGS. 9 to 12 and 14, the webbing-abutting portion 32 is made of a plastic material and is formed to cover an upper section of the frame 31. A sliding space 321 is formed between the webbing-abutting portion 32 and an edge of the through hole 311 of the frame 31 for the supplementary webbing 2A to be mounted therethrough, and the webbing-abutting portion 32 is configured for the supplementary webbing 2A to abut. Preferably, the webbing-abutting portion 32 is formed by a wear-resistant plastic material. In the preferred embodiments, a bottom of the webbing-abutting portion 32 extends into a part of a top of the through hole 311. The sliding space 321 is defined between a bottom surface of the webbing-abutting portion 32 and a bottom edge of the base section 3111 of the through hole 311. An end of the webbing-abutting portion 32 near the sliding space 321 forms a webbing-abutting end 322 to abut the supplementary webbing 2A, and preferably, the webbing-abutting end 322 has multiple protrusions arranged at spaced intervals.

Figure 16:
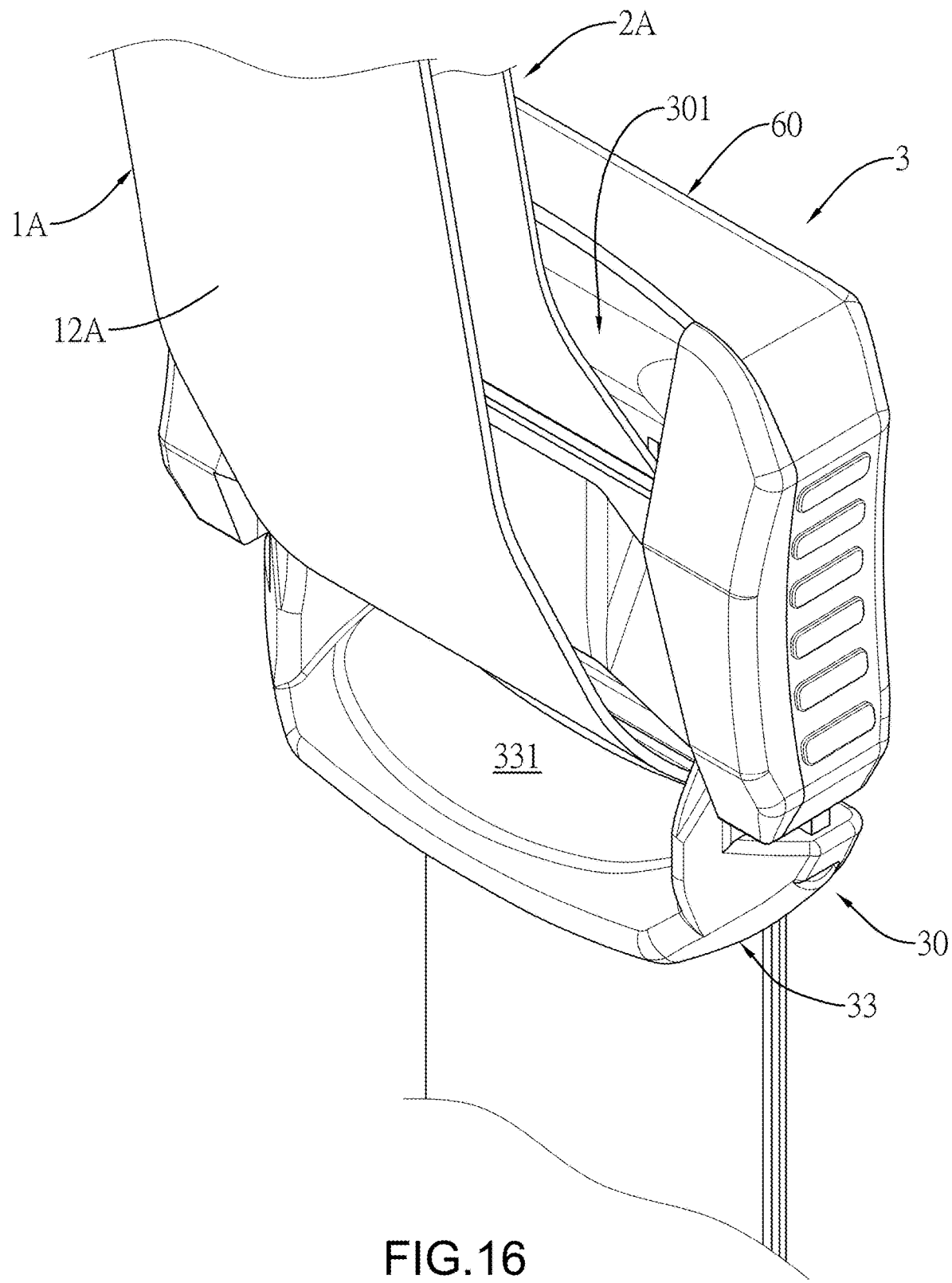
FIG. 16 is a perspective view of the webbing height adjusting unit in FIGS. 6 and 7 with a main webbing and a supplementary webbing mounted therethrough.
Figure 17:
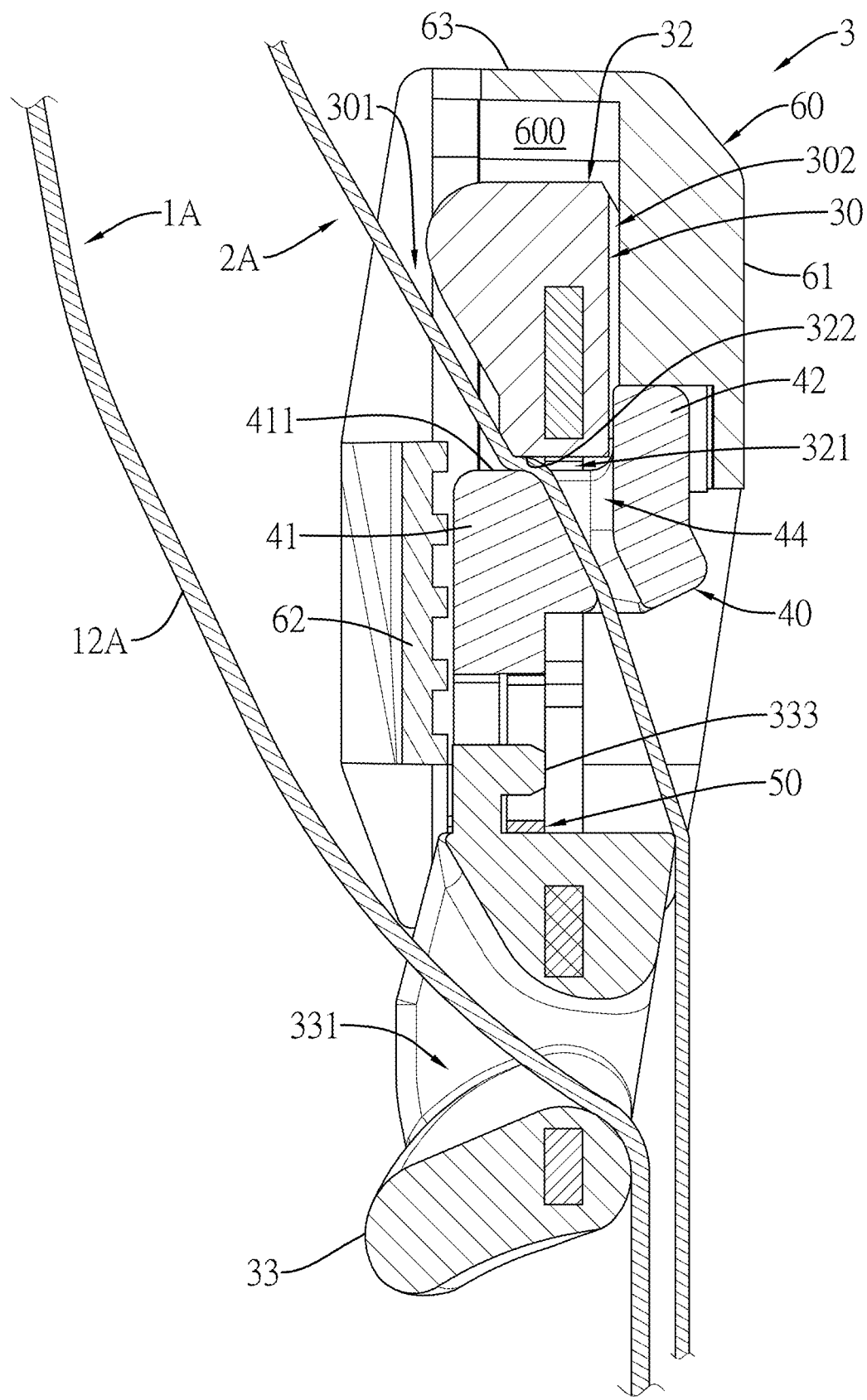
FIG. 17 is a sectional side view of the webbing height adjusting unit in FIGS. 6 and 7 with the main webbing and the supplementary webbing mounted therethrough.
Figure 18:
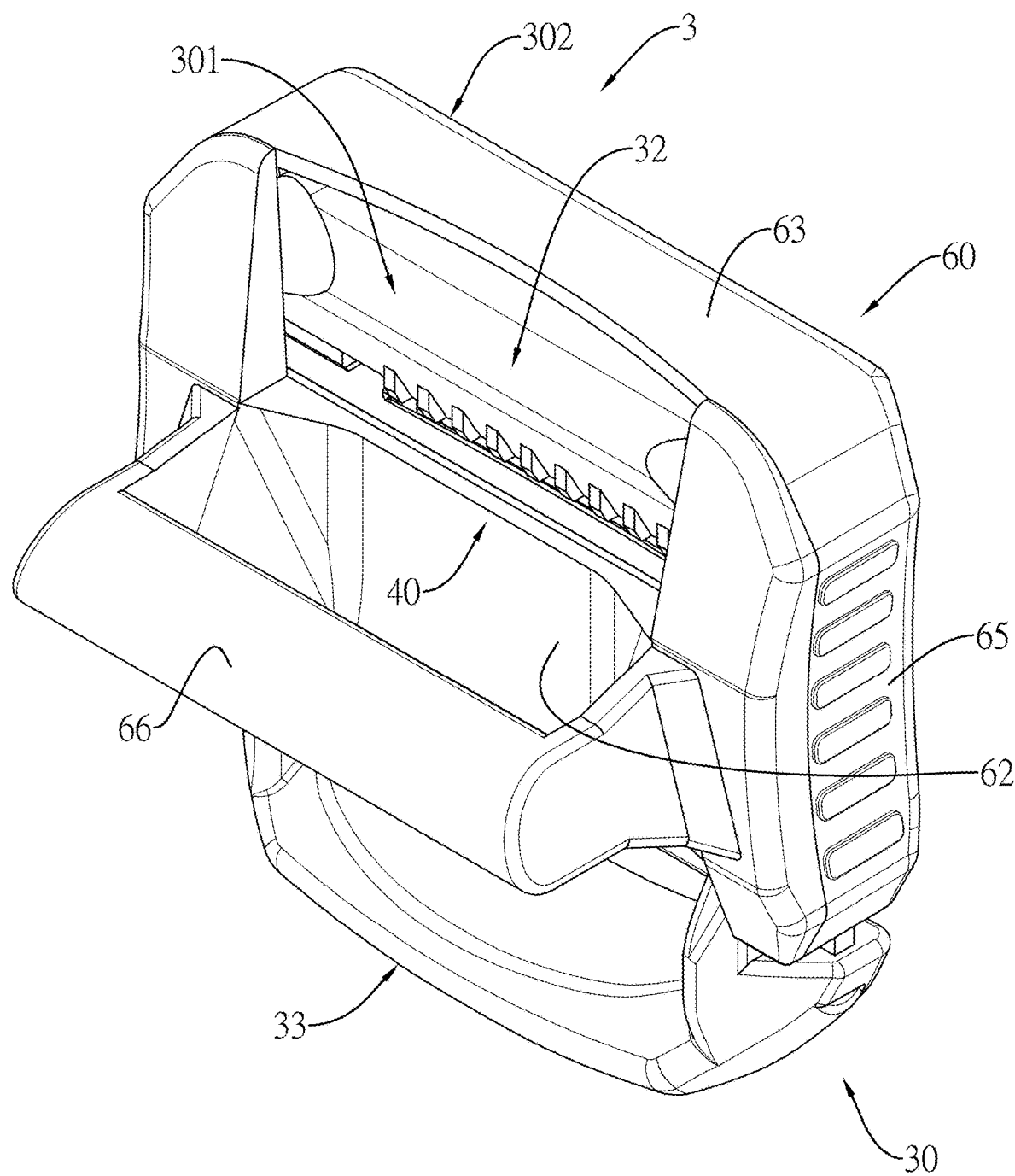
FIG. 18 is a perspective view of the webbing height adjusting unit in another embodiment of the webbing height adjusting device in accordance with the present invention.
Figure 19:
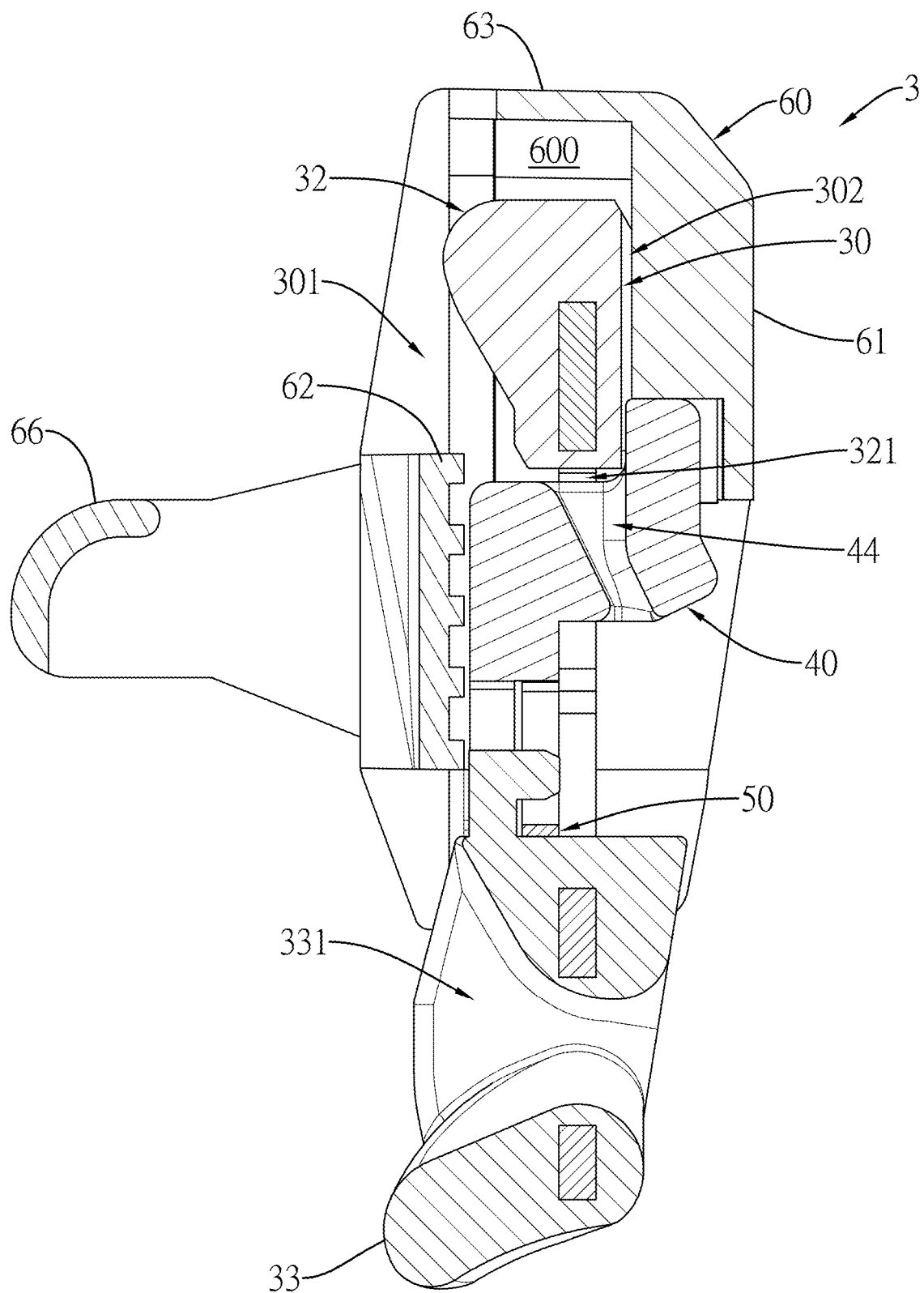
FIG. 19 is a sectional side view of the webbing height adjusting unit in FIG. 18.
Figure 20:
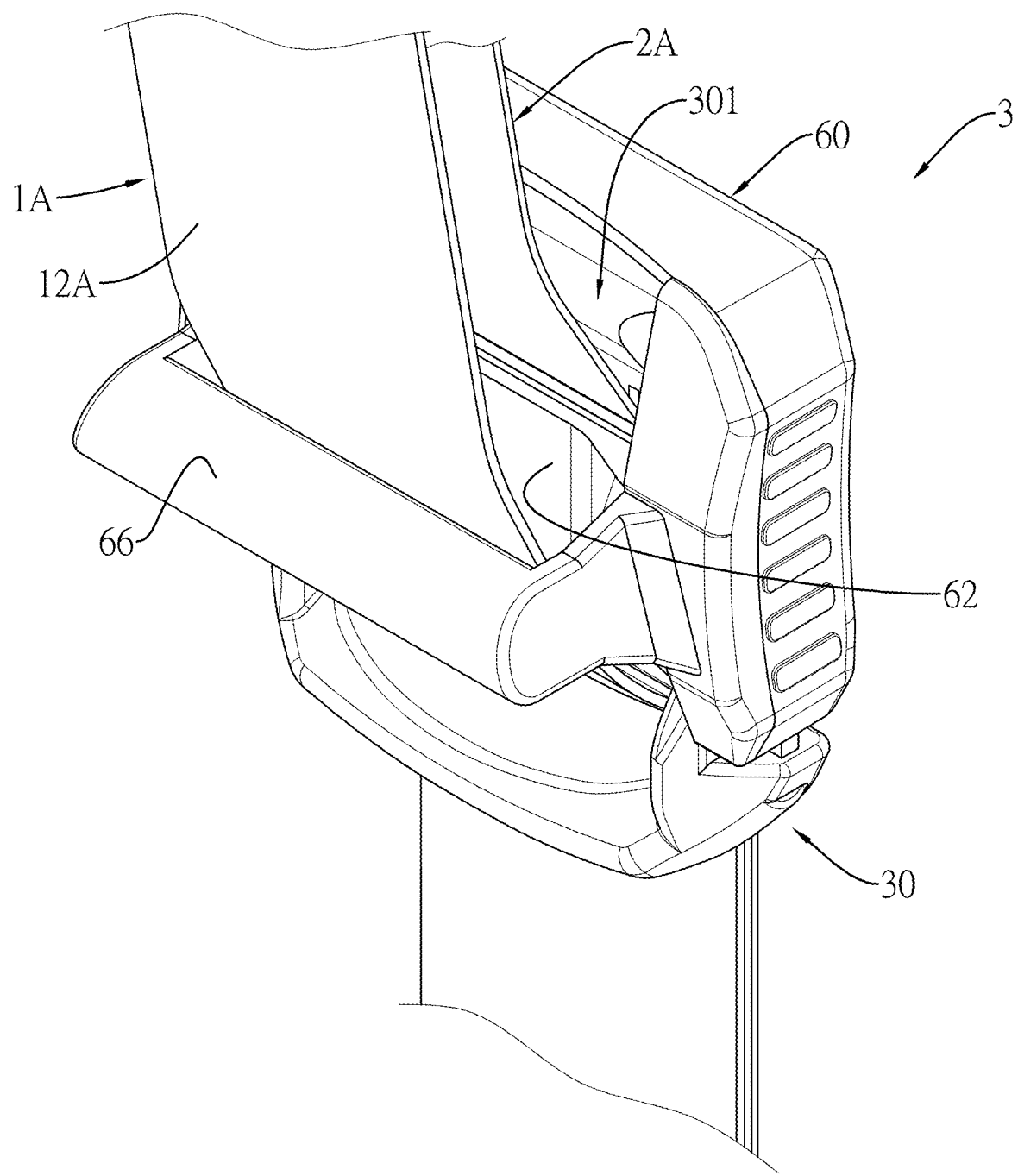
FIG. 20 is a perspective view of the webbing height adjusting unit in FIG. 18 with the main webbing and the supplementary webbing mounted therethrough.
Figure 21:
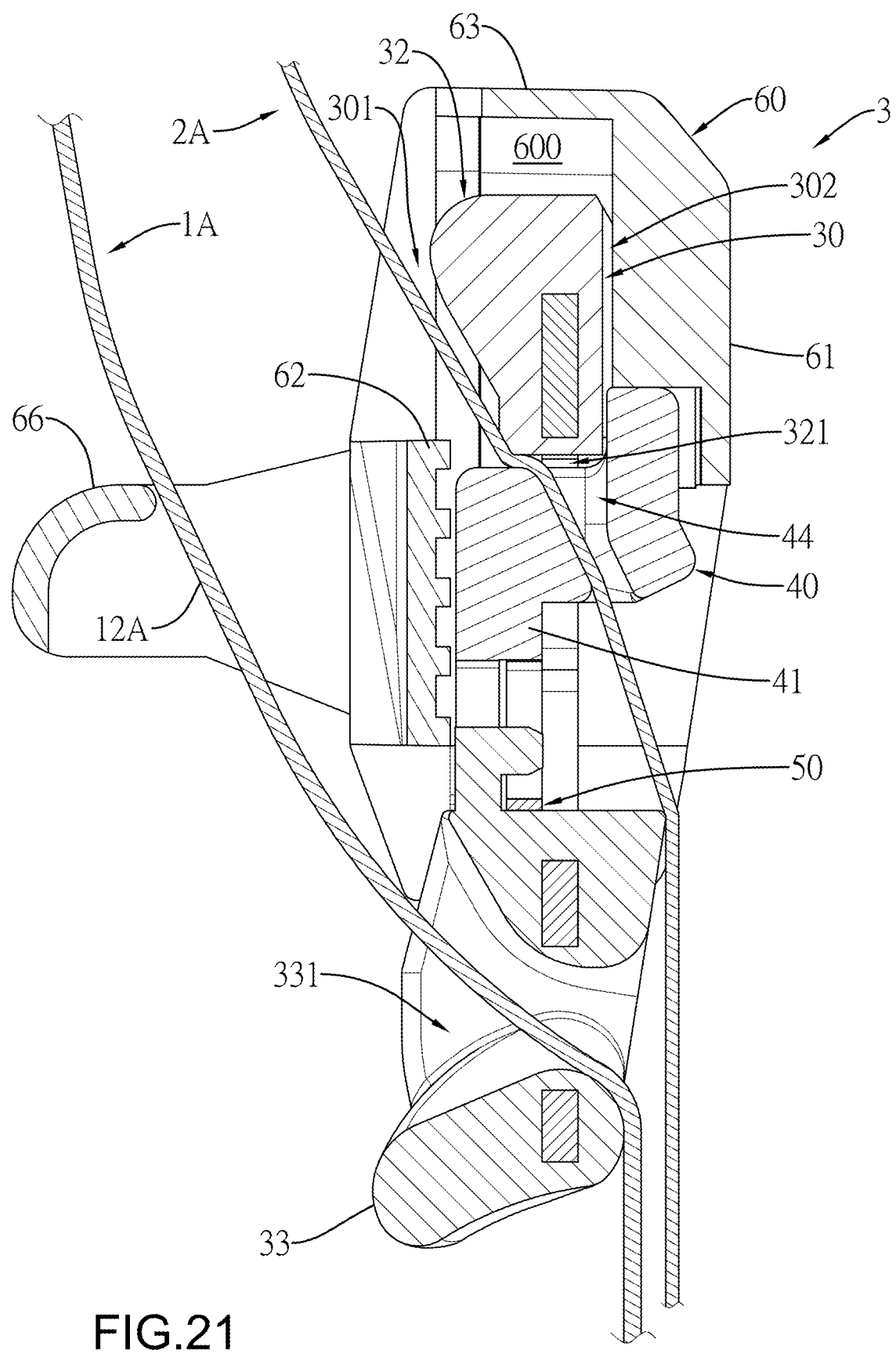
FIG. 21 is a sectional side view of the webbing height adjusting unit in FIG. 18 with the main webbing and the supplementary webbing mounted therethrough, illustrating the webbing height adjusting unit clamping the supplementary webbing.

With reference to FIGS. 9 to 12 and 14, the webbing-mounting portion 33 is made of a plastic material and is formed to cover a lower section of the frame 31. The webbing-mounting portion 33 is connected to and covers the edge of the connecting hole 32 to form the main webbing slot 331 therein. The main webbing slot 331 is configured for the main webbing 1A to be mounted therethrough. The webbing-mounting portion 33 is configured for the main webbing 1A to abut. Preferably, the webbing-mounting portion 33 is formed by a wear-resistant plastic material. A top wall and a bottom wall of the webbing-mounting portion 33 adjacent to the main webbing slot 331 are arc-shaped, which allows the main webbing 1A to be smoothly mounted through the main webbing slot 33, abut against the top wall or the bottom wall of the webbing-mounting portion 33, and be redirected toward another direction as shown in FIGS. 16 and 17.

Figure 14:
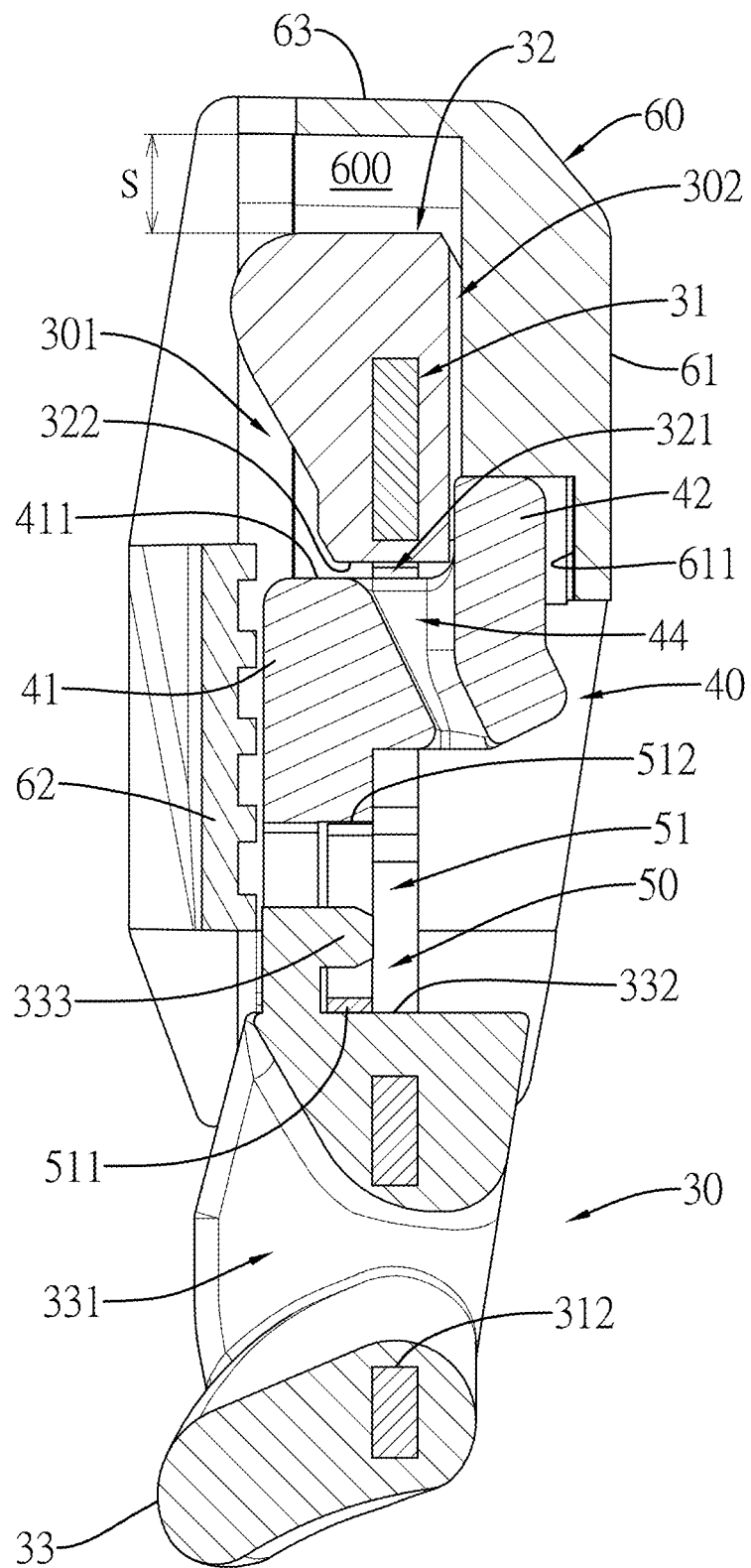
FIG. 14 is a sectional side view of the webbing height adjusting unit in FIGS. 6 to 12.
Figure 15:
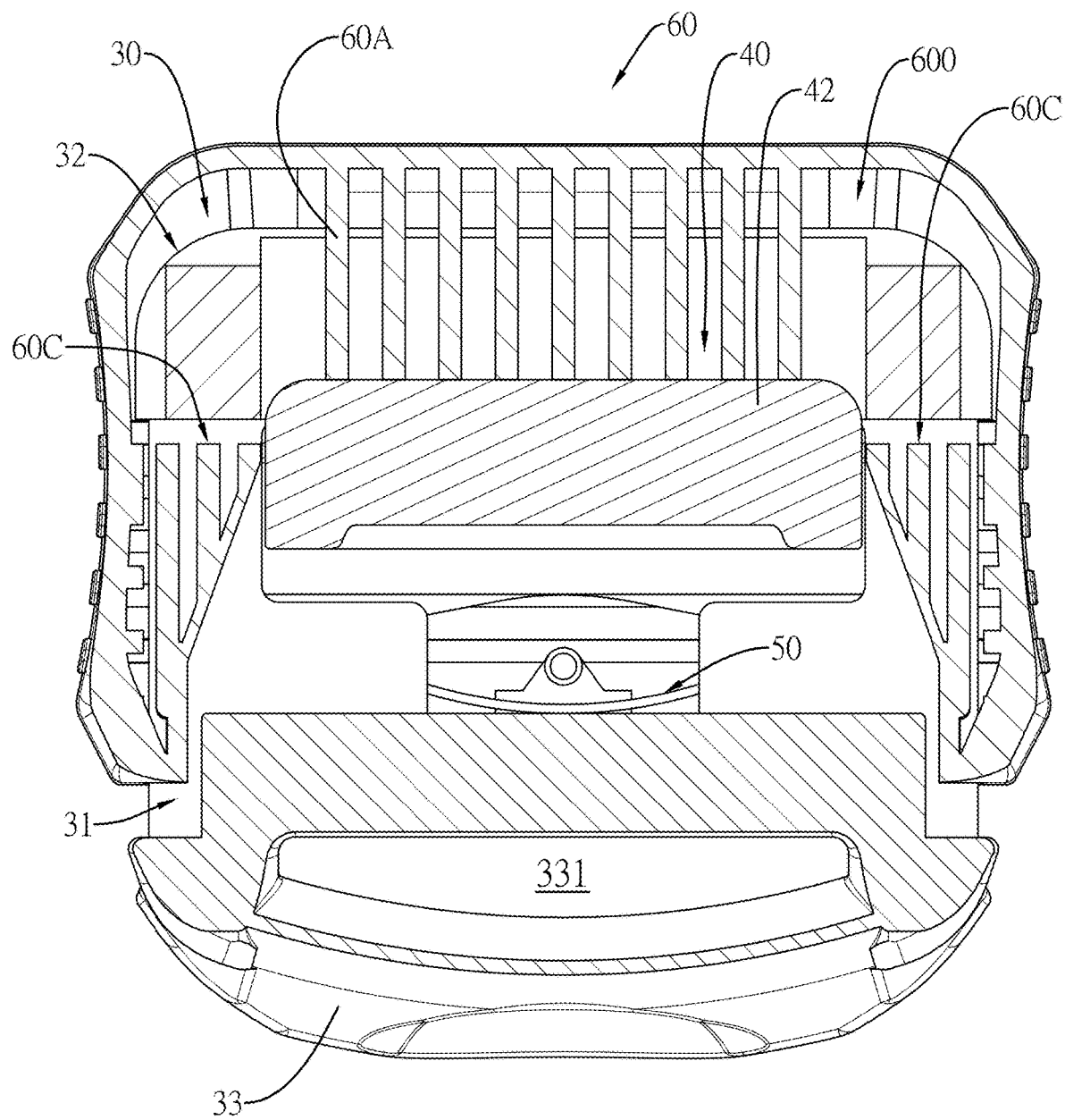
FIG. 15 is a sectional side view of the webbing height adjusting unit across line 15-15 in FIG. 8.

With reference to FIGS. 11, 12, and 14, in the preferred embodiments, the webbing-mounting portion 33 has an abutting surface 332 and a position-limiting post 333. The abutting surface 332 is formed on a top of the webbing-mounting portion 33 and extends into the extending section of the through hole 311. The position-limiting post 333 protrudes from the abutting surface 332, and laterally extends toward the extending section 3112 of the through hole 311 of the frame 31 to form a gap between the position-limiting post 333 and the abutting surface 332.

With reference to FIGS. 9 to 12 and 14, the slider 40 is mounted in the sliding space 321 of the adjuster base 30, is configured to move up and down relative to the adjuster base 30, and has an inclined slot 44 configured for the supplementary webbing 2A to be mounted therethrough. The slider 40 and the webbing-abutting portion 32 allow the webbing height adjusting unit 3 to clamp the supplementary webbing 2A for positioning and to relatively move along the supplementary webbing 2A.

With reference to FIGS. 9 to 12 and 14, in the preferred embodiments, the slider 40 has a first side board 41, a second side board 42, and two connecting portions 43. The first side board 41 and the second side board 42 are arranged at a spaced interval, and the two connecting portions 43 are located between and formed in one piece with the first side board 41 and the second side board 42. The inclined slot 44 obliquely extends between the two connecting portions 43 toward a bottom of the second side board 42 near the webbing-mounting portion 33. The first side board 41 and the second side board 42 are located at the first side 301 and the second side 302 of the adjuster base 30, respectively. The two connecting portions 43 are located in the sliding space 321. The first side board 41 has a clamping surface 411 formed on a top of the first side board 41, and the clamping surface 411 and the webbing-abutting end 322 are configured to clamp the supplementary webbing 2A together.

Figure 10:
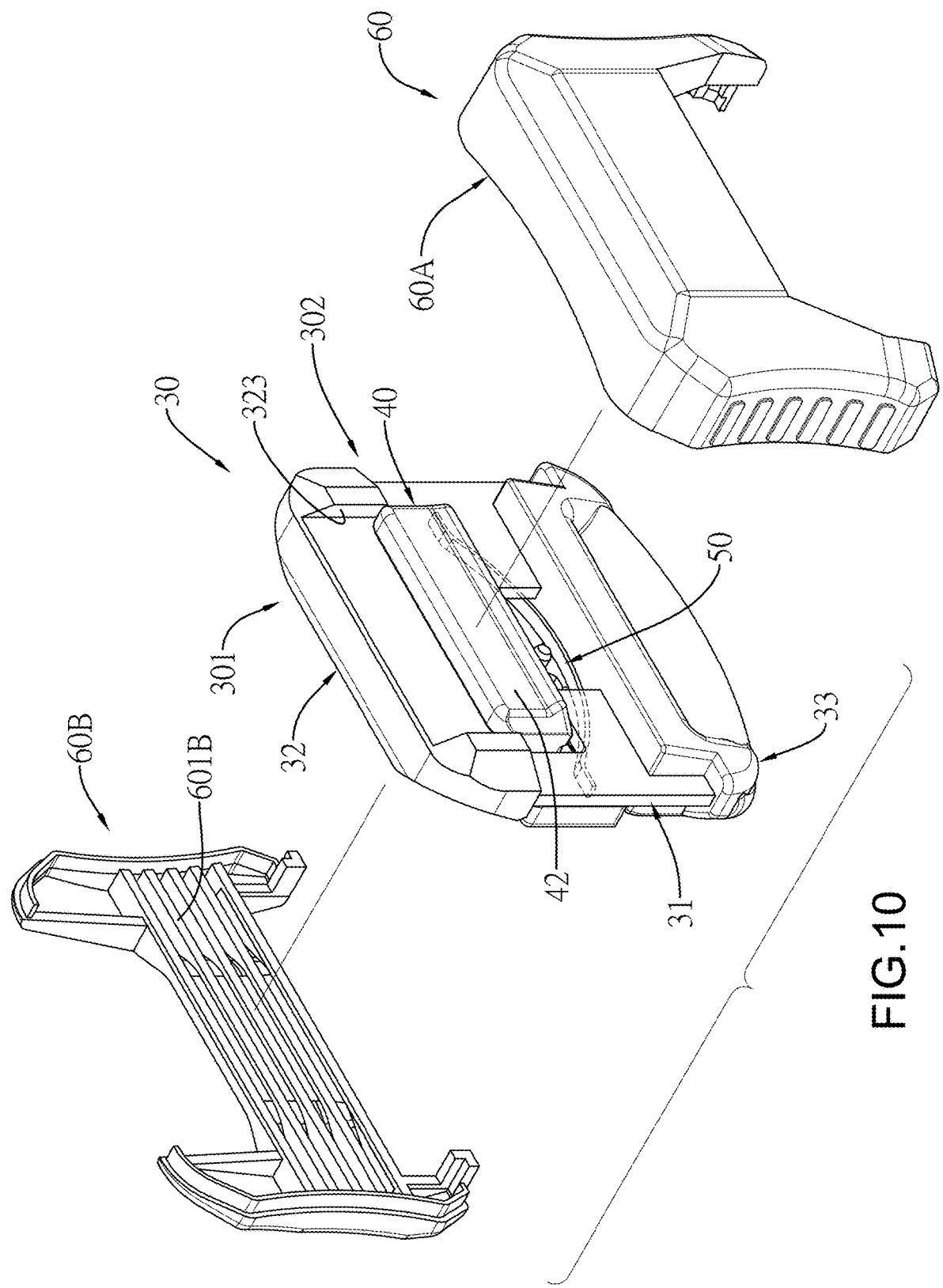
FIG. 10 is another exploded perspective view of the outer shell of the webbing height adjusting unit in FIGS. 6 and 7.

In the preferred embodiments, a top end of the second side board 42 is located higher than a top end of the first side board 41 and a top opening of the inclined slot 44. The first side board 41 further has a mounting groove 412 for containing the elastic member 50. With reference to FIGS. 10 and 12, the webbing-abutting portion 32 has a sliding groove 323 located on the second side 302 of the adjuster base 30, and the second side board 42 of the slider 40 extends into the sliding groove 323 and is configured to move upward and downward.

With reference to FIGS. 9 to 12 and 14, the elastic member 50 is disposed between the slider 40 and a top of the webbing-mounting portion 33 of the adjuster base 30. The elastic member 50 is configured to provide a restoring force to allow the slider 40 and the webbing-abutting portion 32 of the adjuster base 30 to clamp the supplementary webbing 2A together. When the slider 40 and the adjuster base 30 move relative to each other (e.g. the slider 40 is operated to move downward relative to the adjuster base 30, or the adjuster base 30 is operated to move upward relative to the slider 40), the supplementary webbing 2A is unclamped, and elastic energy is stored in the elastic member 50.

In different embodiments, the elastic member 50 may adopt a spiral spring, a flat spring, or any other equivalent elastic component, and a number of said elastic member 50 may be determined according to demands. With reference to FIGS. 9 to 12 and 14, in the preferred embodiments, the elastic member 50 may adopt an arc-shaped flat spring 51. The arc-shaped flat spring 51 has a middle portion 511 and two end portions 512. The two end portions 512 extend upward in a curve from two opposite ends of the middle portion 511 respectively. The middle portion 511 abuts the abutting surface 332 of the webbing-mounting portion 33, and the position-limiting post 333 is located above the middle portion 511 to limit the middle portion 511 between the abutting surface 332 and the position-limiting post 333. The two end portions 512 of the arc-shaped flat spring 51 abut against a bottom of the first side board 41; specifically, the two end portions 512 of the arc-shaped flat spring 51 extend into the mounting groove 412 and abut two sides of a groove wall of the mounting groove 412 respectively. Thereby, restoring forces applied on two opposite sides of the slider 40 respectively can be equal, which allows the slider 40 and the adjuster base 30 to move smoothly.

With reference to FIGS. 6, 7, 14, and 15, the outer shell 60 is disposed on a top of the adjuster base 30. The outer shell 60 is operable to actuate the slider 40 and the adjuster base 30 to move relative to each other so as to unclamp the supplementary webbing 2A, which allows the webbing height adjusting unit 3 to move upward and downward along the main webbing 1A and the supplementary webbing 2A to adjust the height of the top position.

Figure 9:
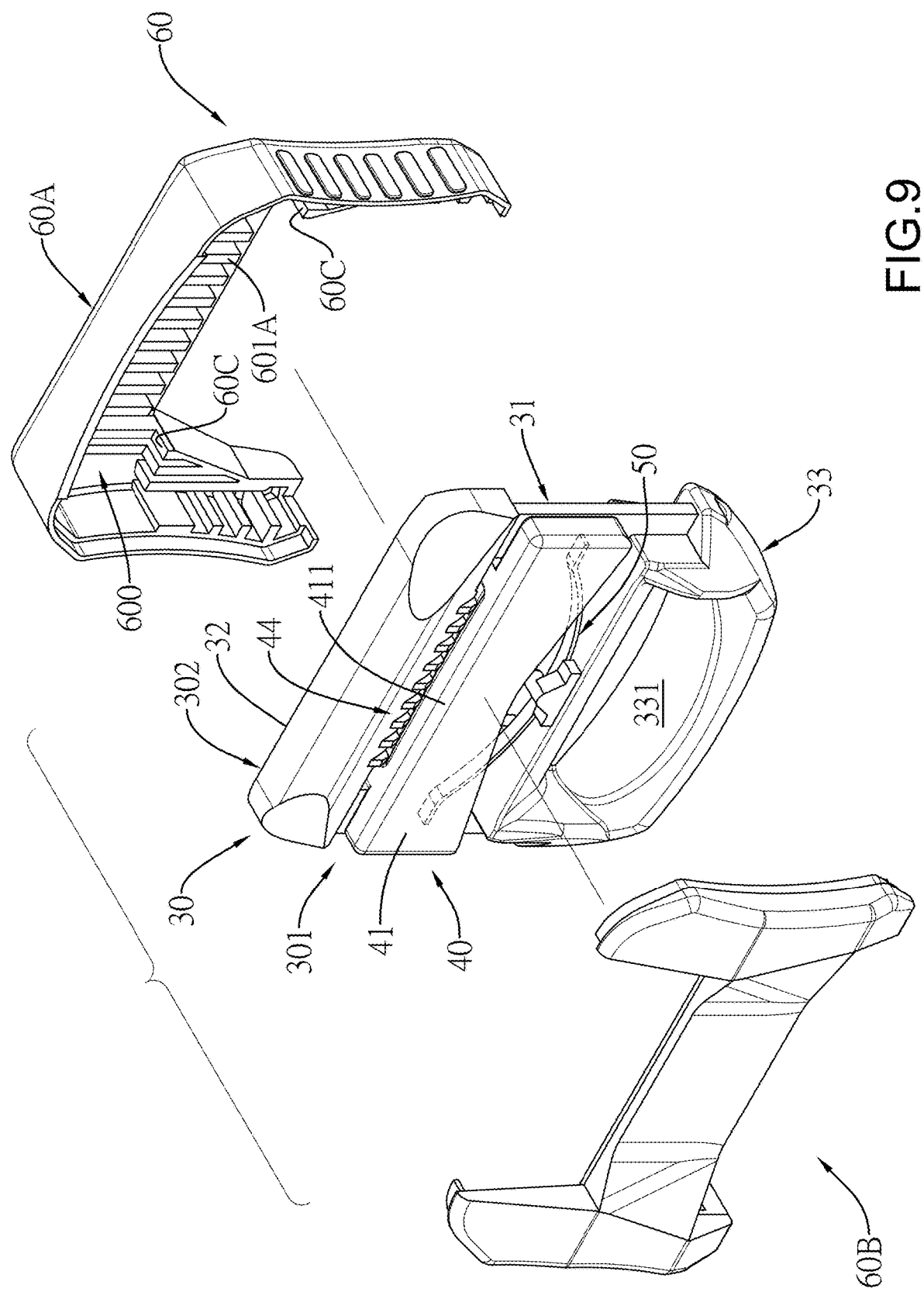
FIG. 9 is an exploded perspective view of an outer shell of the webbing height adjusting unit in FIGS. 6 and 7.

With reference to FIGS. 9 and 10, in the preferred embodiment, the outer shell 60 has a shell base 60A and a shell cover 60B connected and fixed to each other. Each one of the shell base 60A and the shell cover 60B has multiple ribs 601A/601B disposed on its internal surface so as to improve mechanical strength of the shell base 60A and the shell cover 60B.

With reference to FIGS. 6 to 9, 14, and 15, the outer shell 60 has an operation space 600 and two abutting portions 60C. The operation space 600 is formed on an upper section of an interior of the outer shell 60, and the two abutting portions 60C are located below two opposite sides of the operation space 600 respectively. The webbing-abutting portion 32 of the adjuster base 30 is configured to move up and down in the operation space 600, and the two abutting portions 60C is located below the webbing-abutting portion 32; thereby, when the outer shell 60 is pulled upward, the two abutting portions 60C push the webbing-abutting portion 32 such that the adjuster base 30 and the slider 40 move relative to each other; the outer shell 60 may also move downward to push the second side board 42 of the slider 40 such that the adjuster base 30 and the slider 40 move relative to each other.

With reference to FIGS. 6 to 9 and 14, in the preferred embodiments, the outer shell 60 has a first plate portion 61, a second plate portion 62, and a top side wall 63. The first plate portion 61 is disposed beside the second side board 42 of the slider 40 (i.e. the second side 302 of the adjuster 30) and is configured to abut a top of the second side board 42. The second plate portion 62 is disposed beside the first side board 41 of the slider 40 (i.e. the first side 301 of the adjuster 30). The top side wall 63 is connected to a top of the first plate portion 61, and the outer shell 60 has a webbing-mounting space defined between the top side wall 63 and a top of the second plate portion 62. The top side wall 63 is located above the webbing-abutting portion 32 and has a side surface facing the operating space 600. The supplementary webbing 2A is sequentially mounted through the webbing-mounting space between the top side wall 63 and the second plate portion 62, the sliding space 321, and the inclined slot 44 of the slider 40 from a position above one of two opposite sides of the outer shell 60, and then extends downward from the other one of the two opposite sides of the outer shell 60. The supplementary webbing 2A is clamped by the slider 40 and the adjuster base 30 under the restoring force. The main webbing 1A is mounted through the main webbing slot 331 of the webbing-mounting portion 33 from one of two sides of the outer shell 60 on the second plate portion 62 and extends downward from the other one of the two sides of the outer shell 60.

With reference to FIGS. 16 and 17, when the slider 40 and the adjuster base 30 clamp the supplementary webbing 2A, the outer shell 60 moves downward due to the gravity and abuts the second side board 42 of the slider 40 pushed upward by the restoring force. An operation gap S is formed between the side surface of the top side wall 63 of the outer shell 60 and a top of the webbing-abutting portion 32 of the adjuster base 30. When operating the outer shell 60 to push the slider 40 downward, the slider 40 and the adjuster base 30 are configured to move relatively at a distance equal to the operation gap S, and the side surface of the top side wall 63 abuts the top of the webbing-abutting portion 32 to limit the relative movement of the slider 40 and the adjuster base 30, which prevents the elastic member 50 from deformation due to overloading and maintains the elasticity of the elastic member 50 between the slider 40 and the adjuster base 30. Additionally, when the webbing-abutting portion 32 of the adjuster base 30 moves up and down in the operation space 600 of the outer shell 60, the two abutting portions 60C located below the webbing-abutting portion 32 limit the position of the webbing-abutting portion 32 and prevent the adjuster base 30 and the outer shell 60 from being detached from each other.

Figure 7:
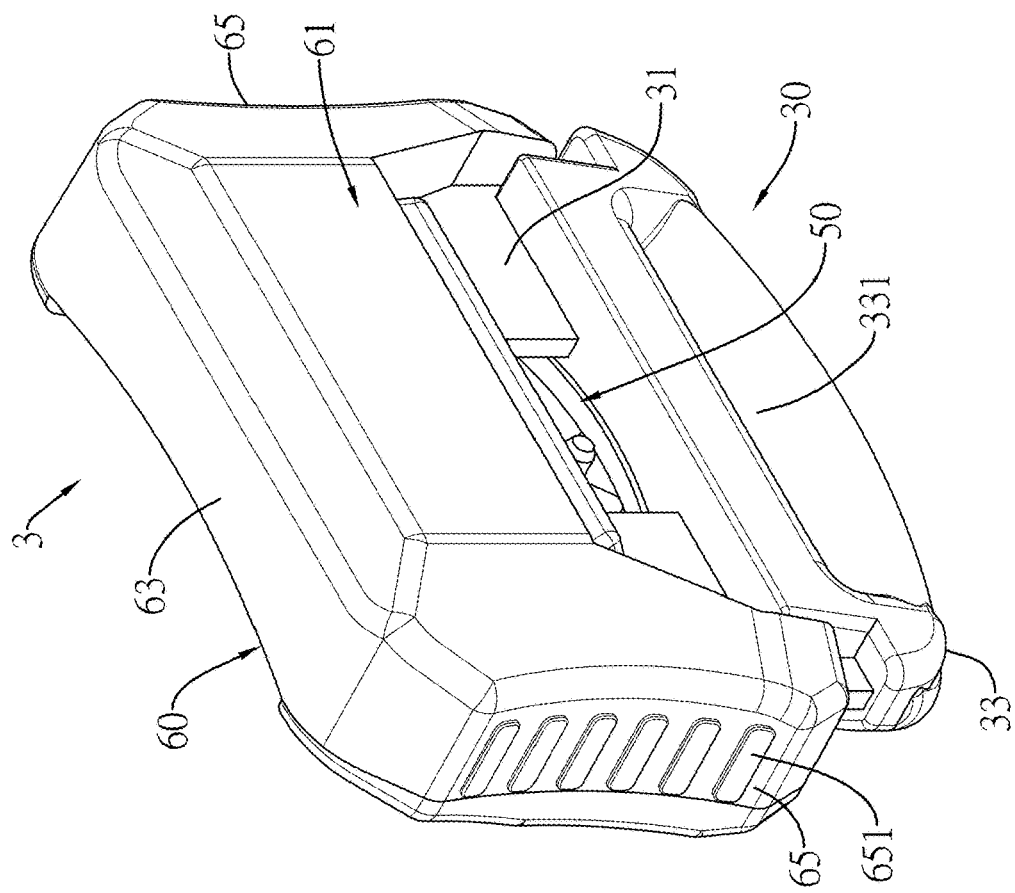
FIG. 7 is another perspective view of the webbing height adjusting unit of the webbing height adjusting devices in FIGS. 1, 2, 4, and 5.
Figure 6:
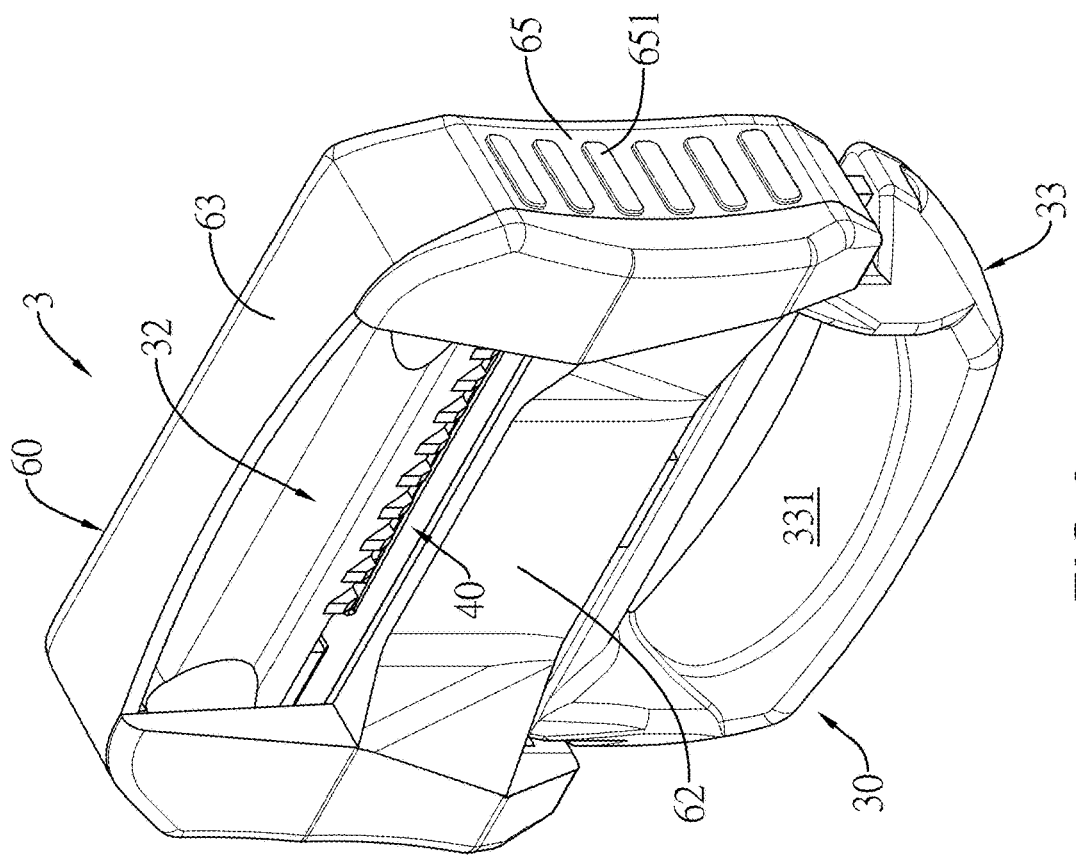
FIG. 6 is a perspective view of a webbing height adjusting unit of the webbing height adjusting devices in FIGS. 1, 2, 4, and 5.
Figure 8:
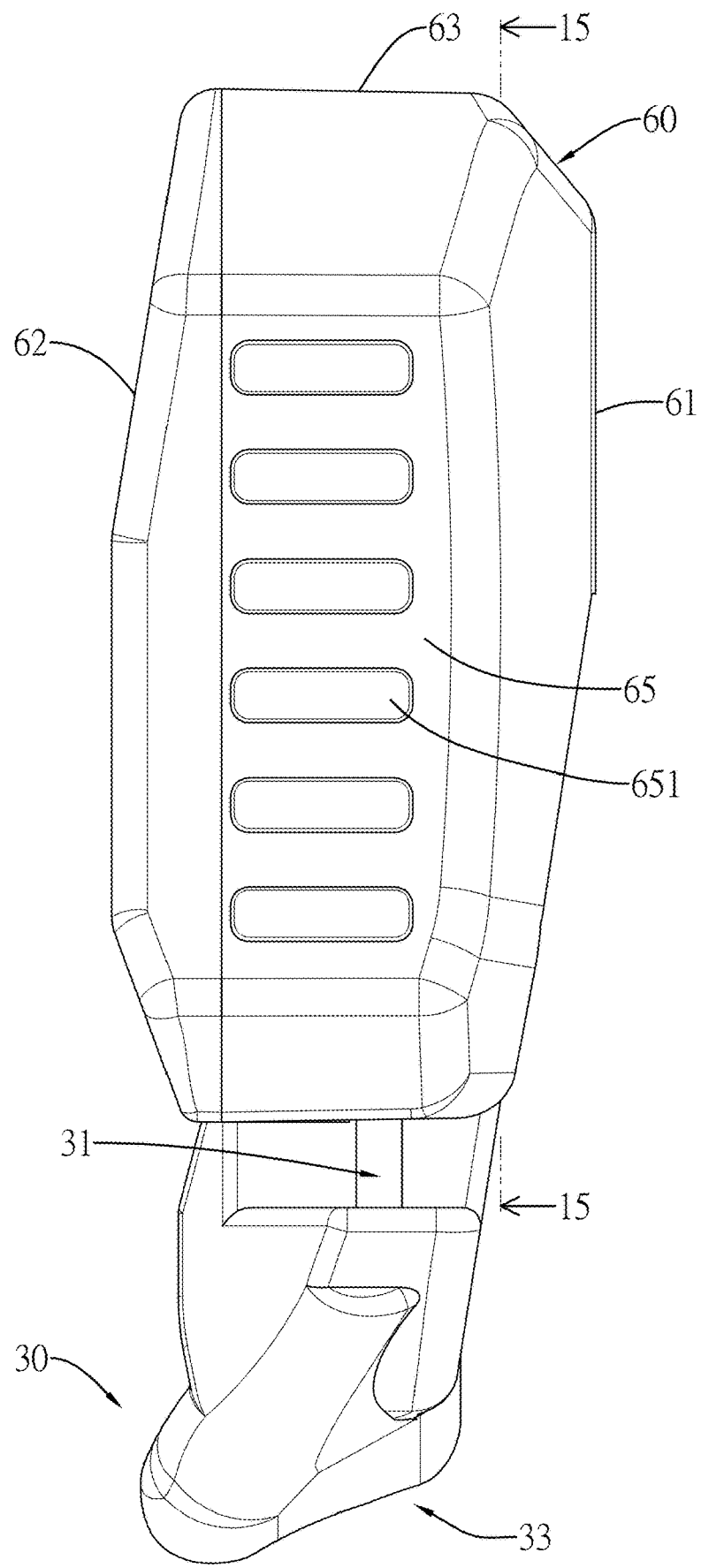
FIG. 8 is a side view of the webbing height adjusting unit in FIGS. 6 and 7.

With reference to FIGS. 6 and 7, in the preferred embodiments, the outer shell 60 has two side walls 65 located on two opposite sides of the outer shell 60 and connected to the second plate portion 62 and the first plate portion 61. Each one of the two side walls 65 has a slip-proof surface 651 formed on its periphery, which allows the occupant to easily operate the outer shell 60 for actuating the slider 40 and the adjuster base 30 to move relatively.

With reference to FIG. 14, in the preferred embodiments, the outer shell 60 has a receiving groove 611 formed by the second plate portion 62 and the two side walls 65. The top of the second side board 42 of the slider 40 is insertable into the receiving groove 611, which ensures the slider 40 to be directly actuated by the outer shell 60.

With reference to FIGS. 18 to 21, in other embodiments, the outer shell 60 may further have a bridge portion 66 formed on the second plate portion 62 and a space formed between the bridge portion 66 and the second plate portion 62. The main webbing 1A is first mounted through the space between the bridge portion 66 and the second plate portion 62 and then mounted through the main webbing slot 331. The bridge portion 66 is utilized to guide the direction of a portion of the main webbing 1A near the webbing height adjusting unit 3.

The webbing height adjusting device of the present invention applied in the seat belt system 1 of the vehicle is shown in FIGS. 1, 2, 4, and 5. The supplementary webbing 2A of the shock absorbing component 2 is located between the rear section 11A and the front section 12A of the main webbing 1A. The webbing height adjusting unit 3 is disposed below the D-loop 2C of the shock absorbing component 2 and is located between and connected to the supplementary webbing 2A and the main webbing 1A. The webbing height adjusting unit 3 is placed laterally due to the gravity and is configured to form the top position above the shoulder of the occupant, and the height of the top position is adjustable according to the occupant's body shape. The webbing height adjusting unit 3 connected to the supplementary webbing 2A and the main webbing 1A allows stepless adjustment of the height position of the top position, and the shock absorbing component 2 having said elastic element 2B provides the function of shock absorbing for the main webbing 1A securing the occupant on the seat.

Figure 22:
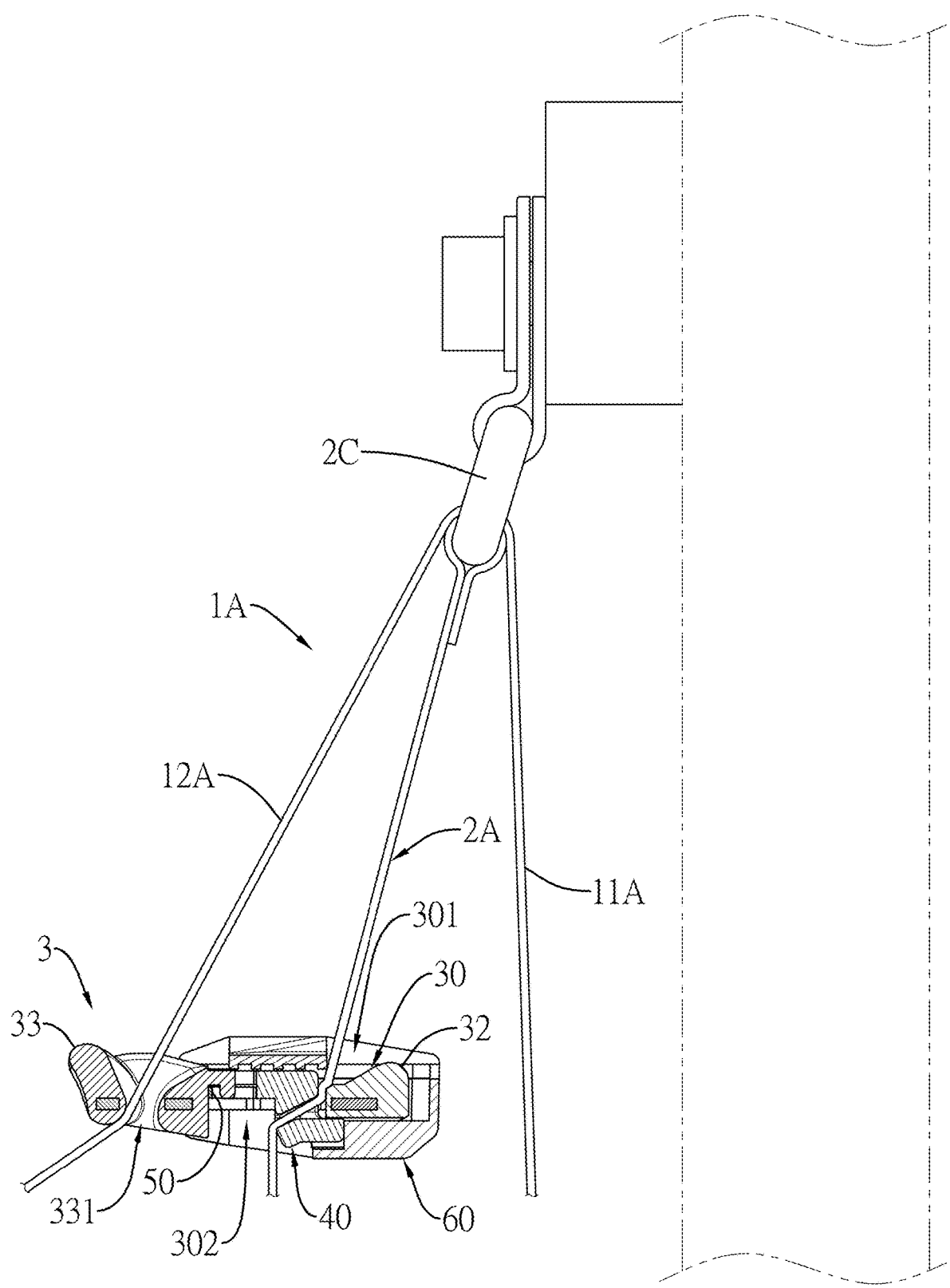
FIG. 22 is an operational view of the supplementary webbing being clamped by the webbing height adjusting unit of the webbing height adjusting devices in FIGS. 1 and 4.
Figure 23:
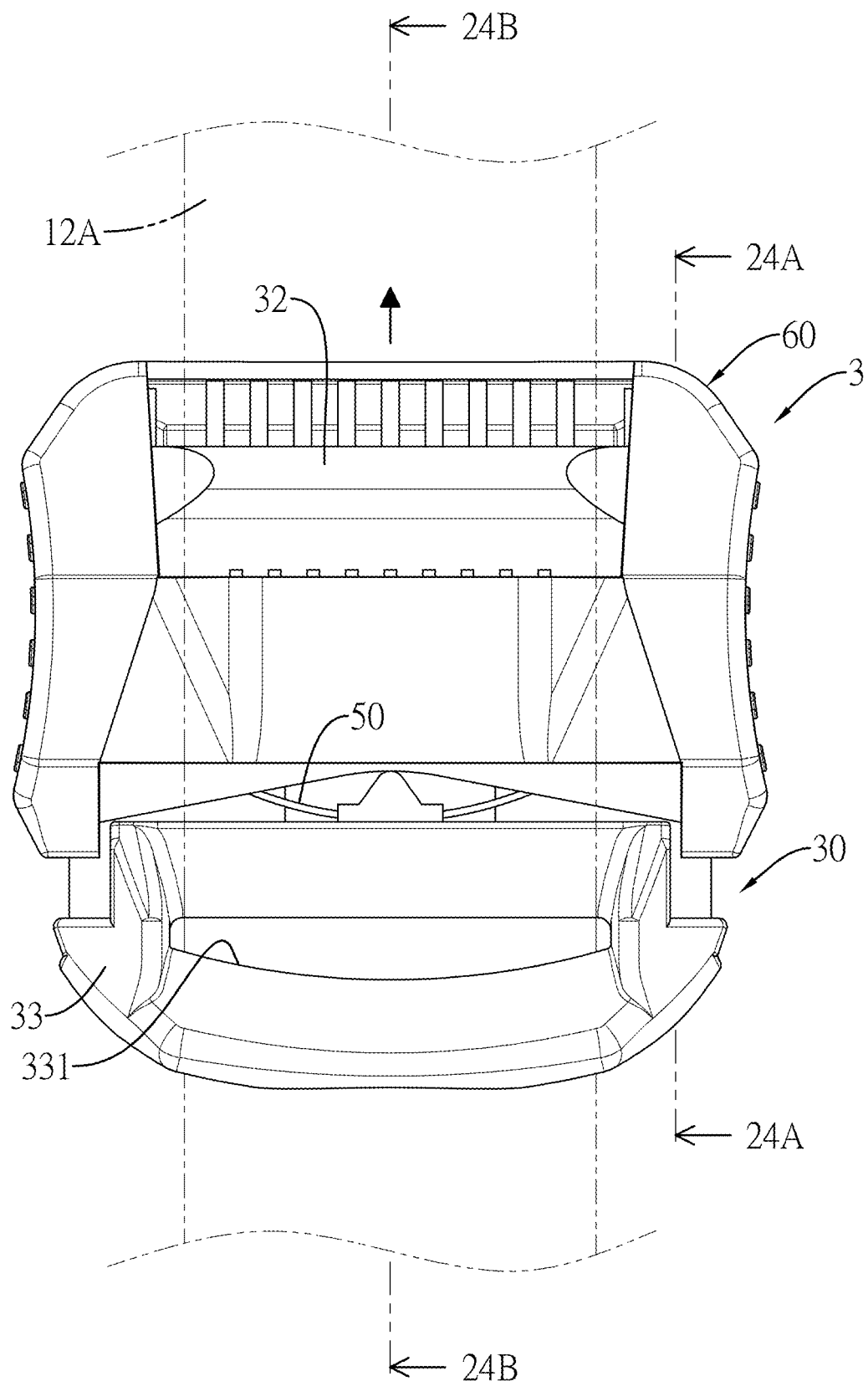
FIG. 23 is an operational view of a height position of the webbing height adjusting unit in FIG. 22 being adjusted upward.
Figure 24A:
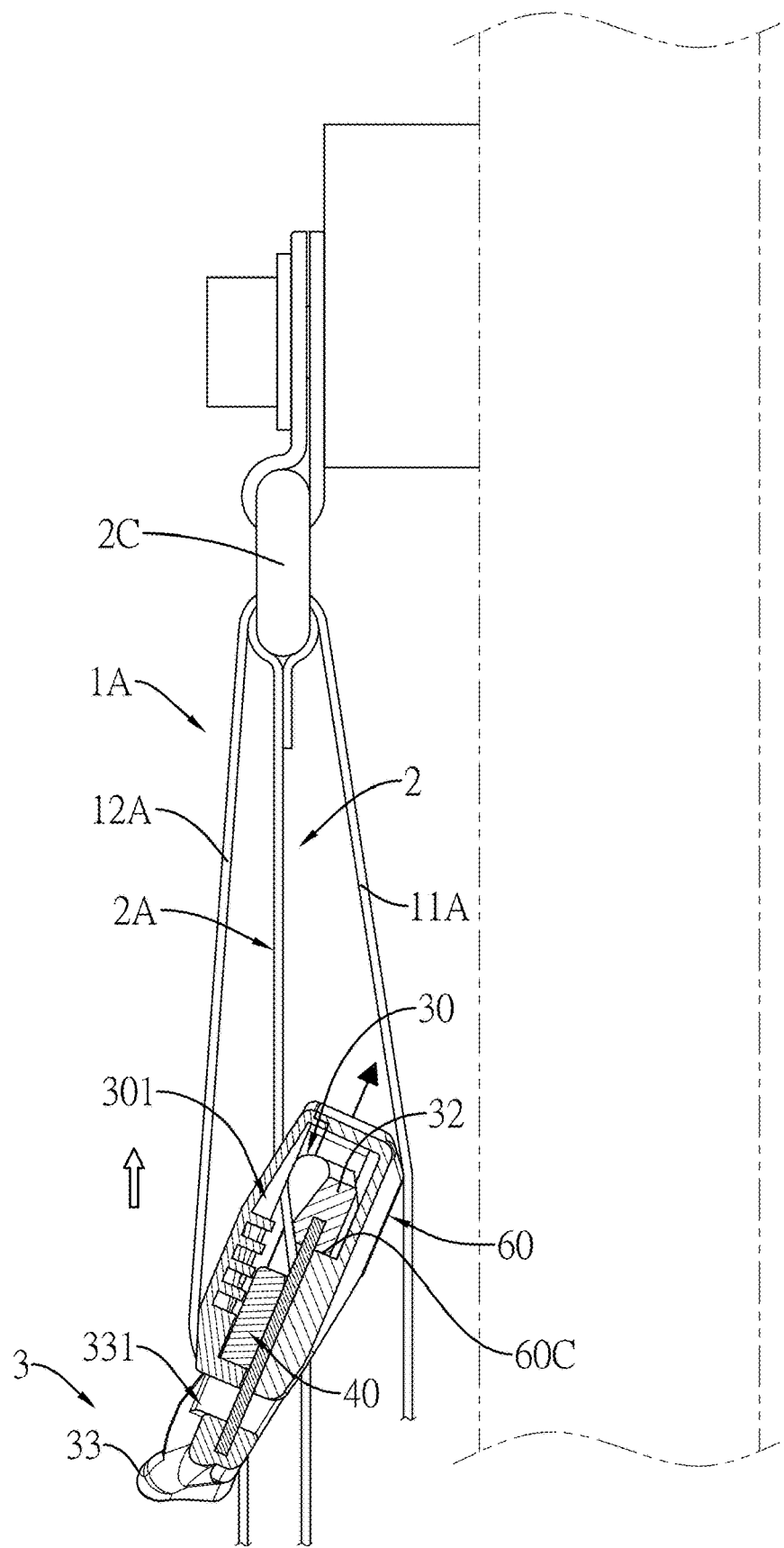
FIG. 24A is a sectional operational view of the webbing height adjusting unit across line 24A-24A in FIG. 23.
Figure 24B:
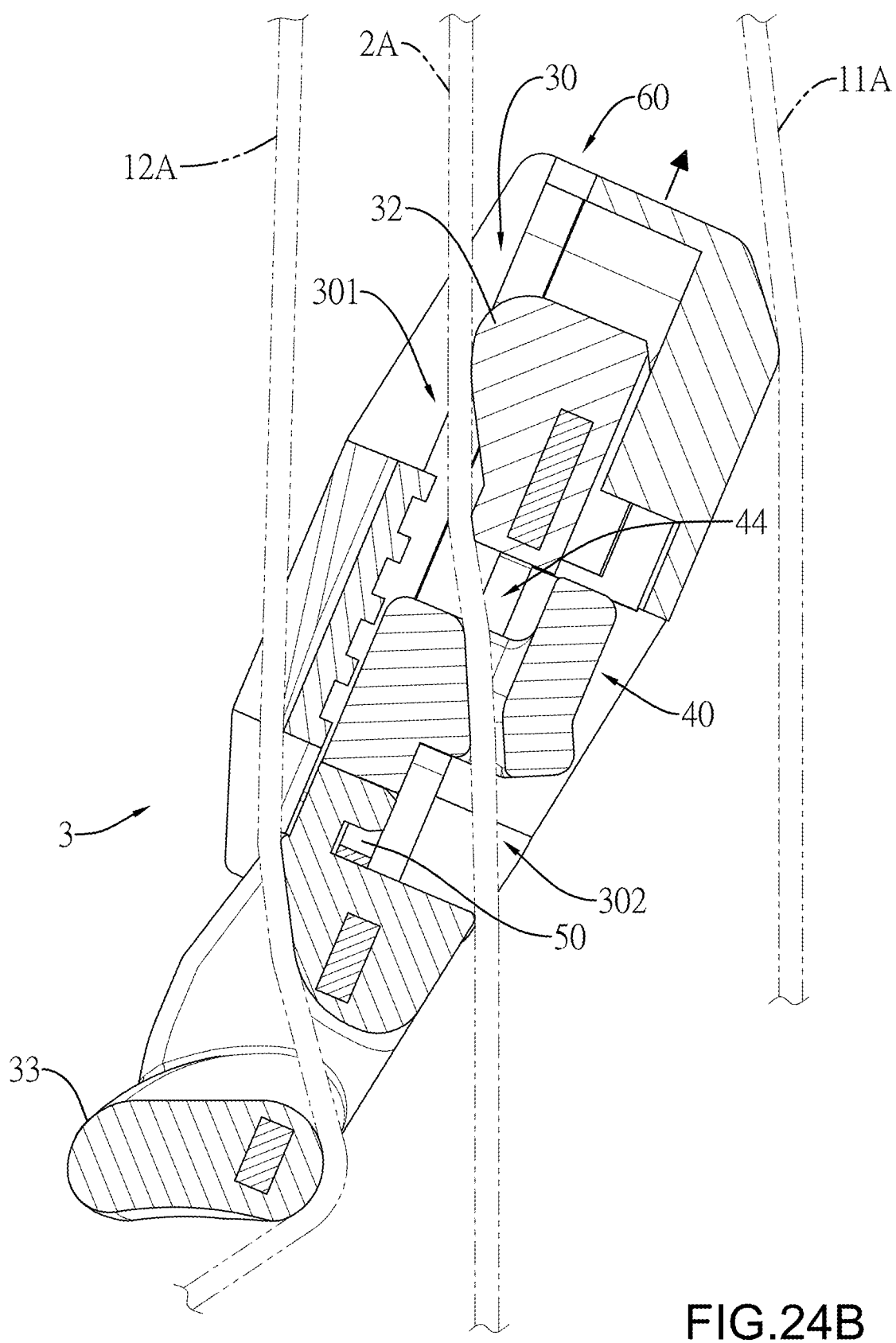
FIG. 24B is a sectional operational view of the webbing height adjusting unit across line 24B-24B in FIG. 23.
Figure 25:
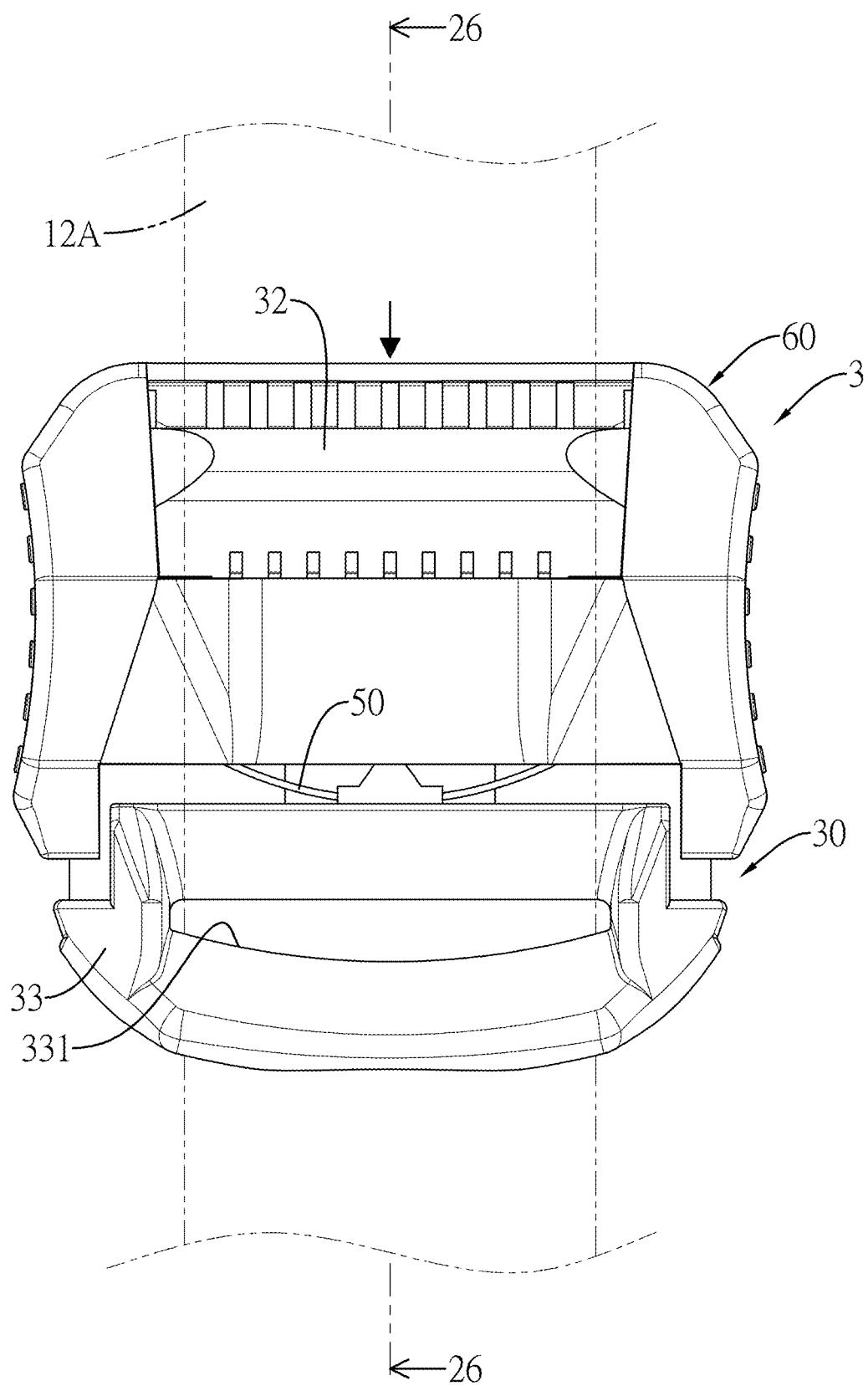
FIG. 25 is an operational view of the height position of the webbing height adjusting unit in FIG. 22 being adjusted downward.
Figure 26:
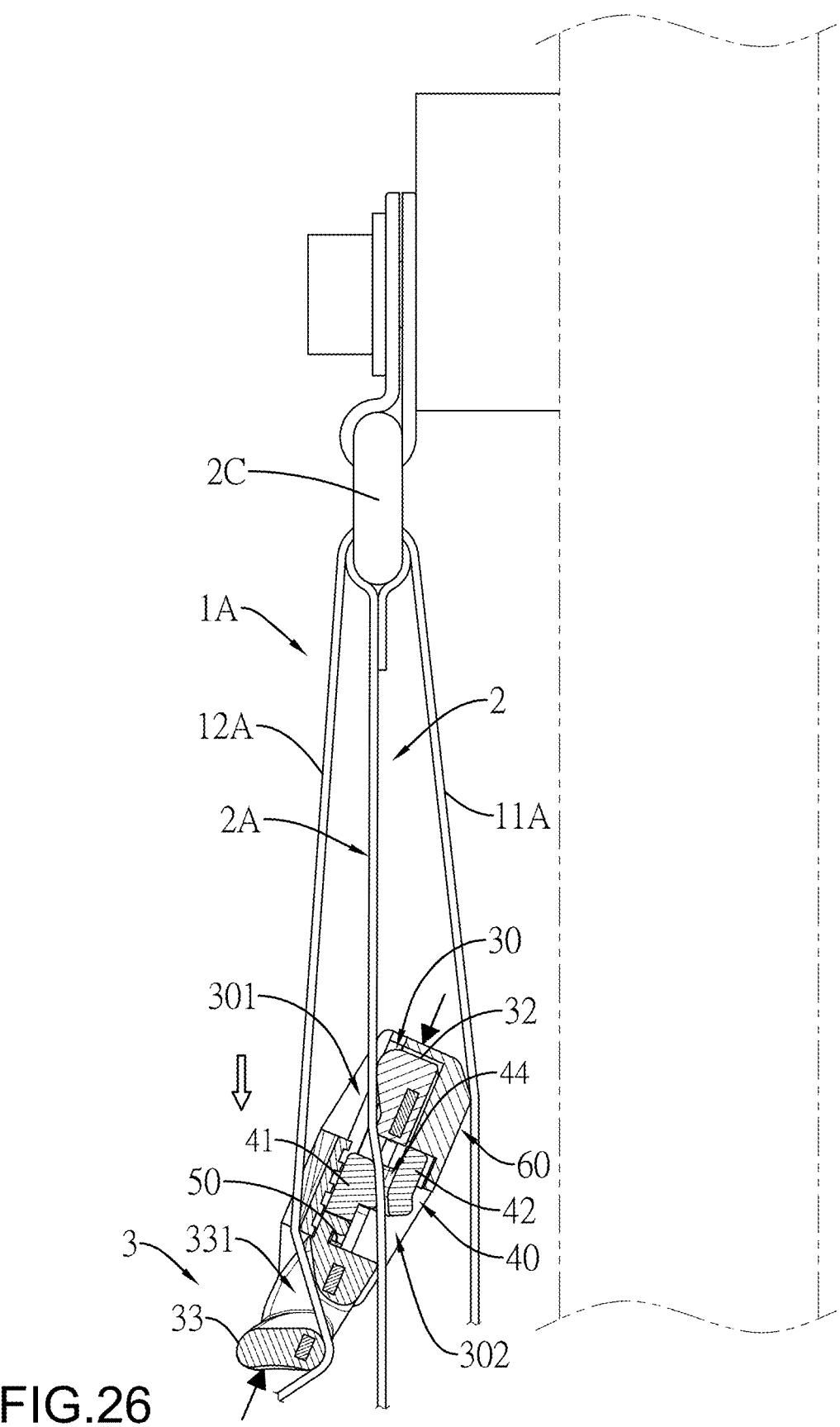
FIG. 26 is a sectional operational view of the webbing height adjusting unit across line 26-26 in FIG. 25.
Figure 27:
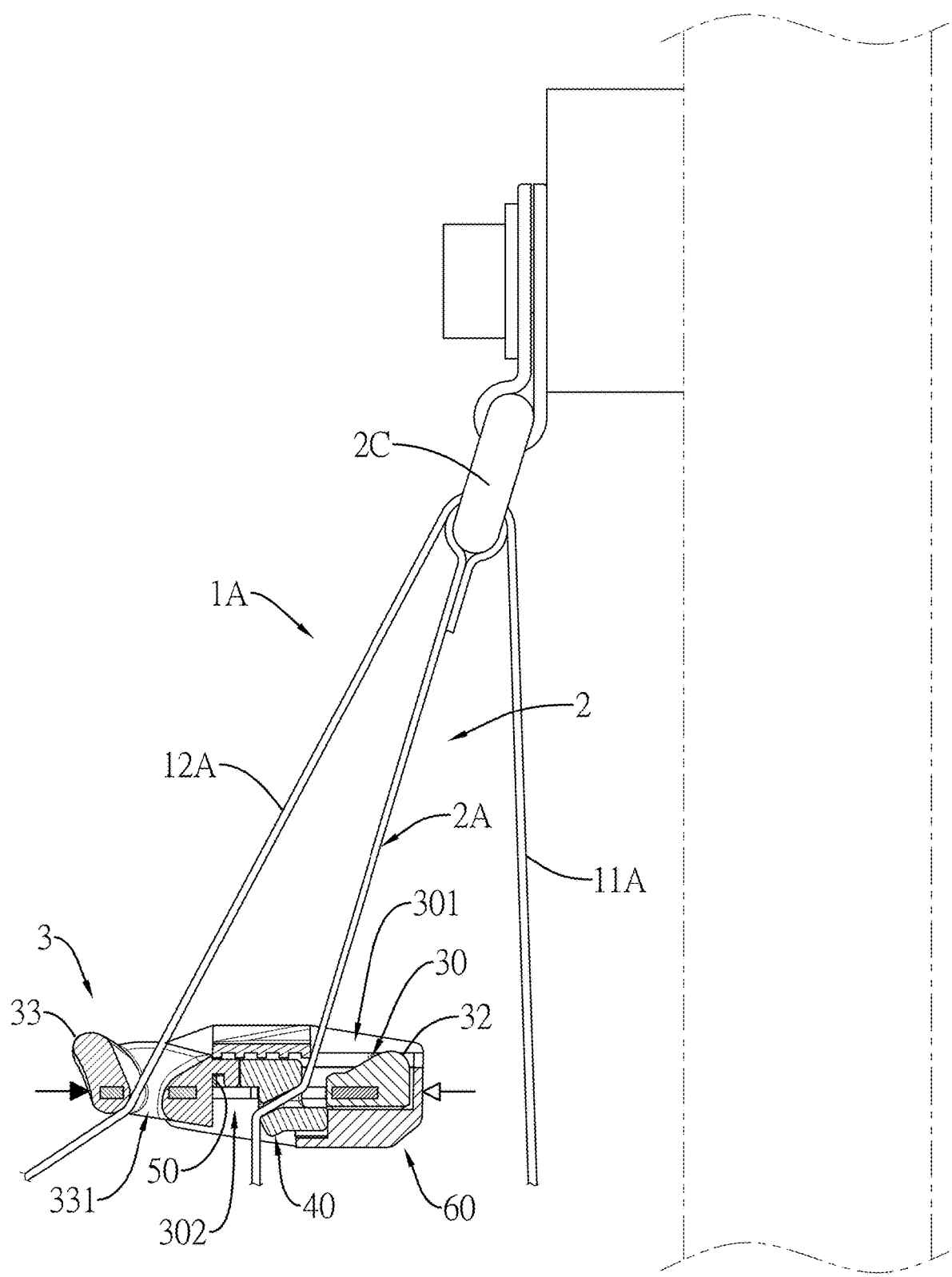
FIGS. 27 to 29 depict different ways of compressing and adjusting the height position of the webbing height adjusting unit in FIG. 22.
Figure 28:
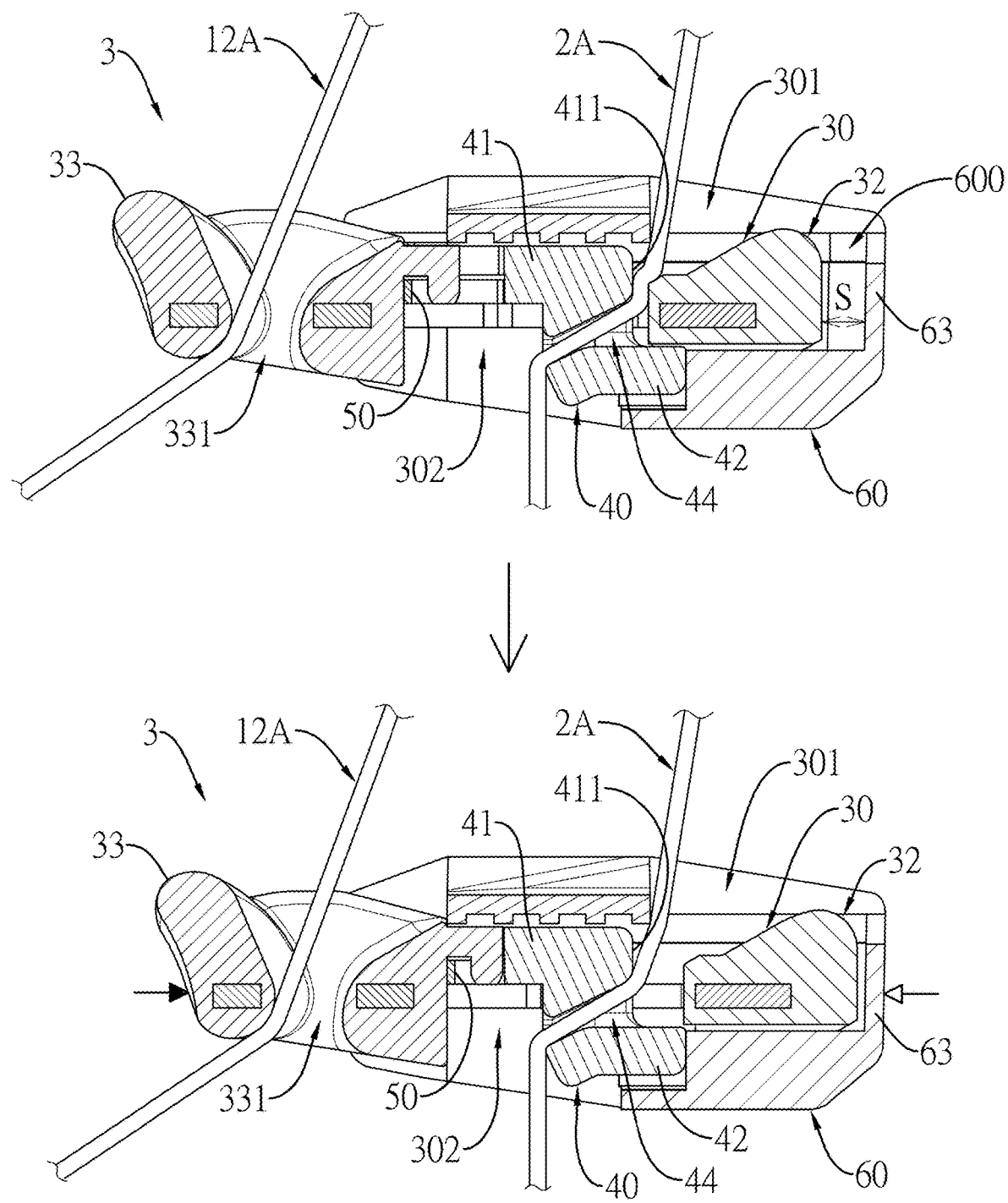
Figure 29:
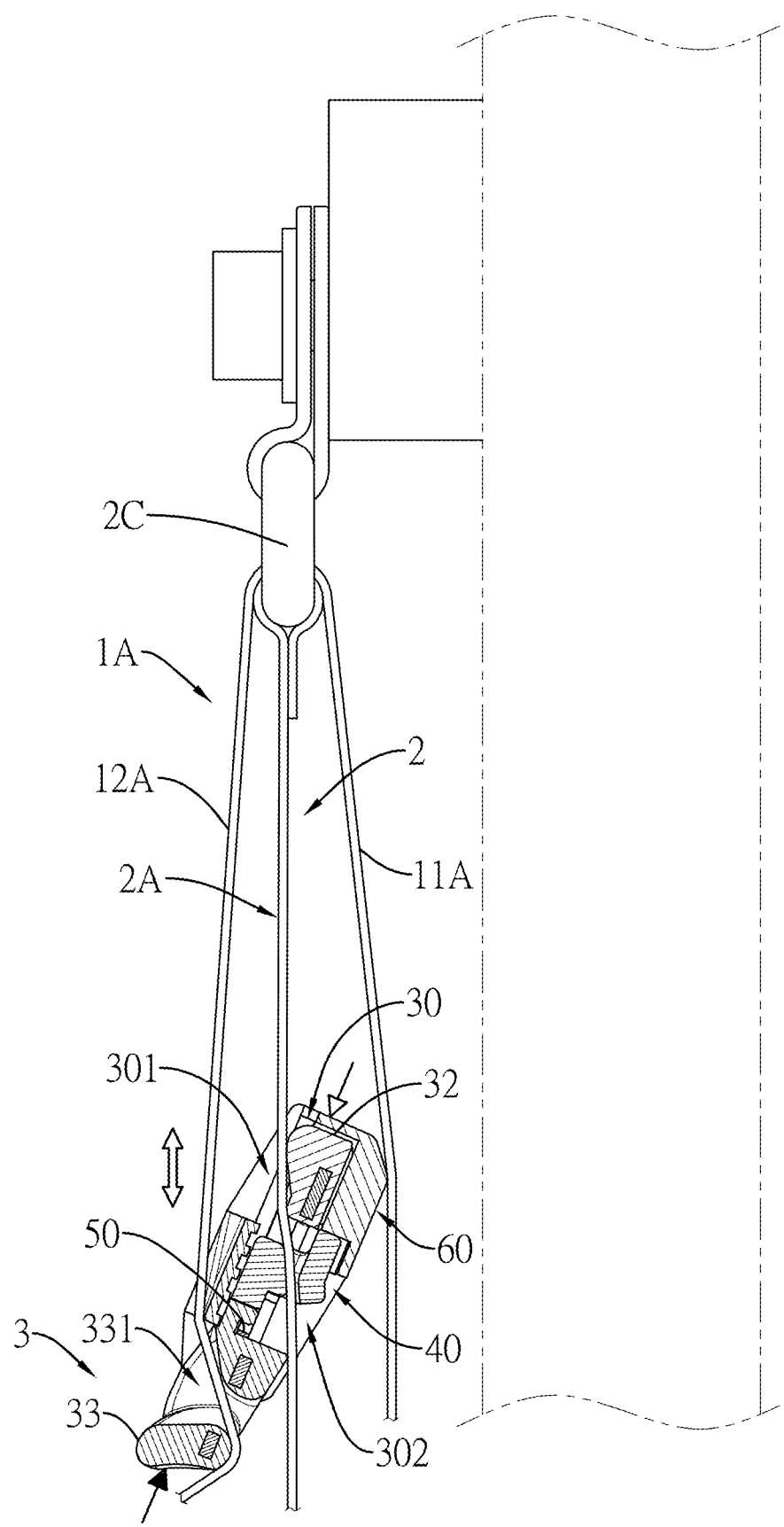

With reference to FIGS. 1, 4, and 22, the webbing height adjusting unit 3 is located between and connected to the supplementary webbing 2A and the main webbing 1A. The supplementary webbing 2A is mounted through the sliding space 321 and the inclined slot 44, wherein the supplementary webbing 2A is clamped by the clamping surface 411 of the first side board 41 of the slider 40 and the webbing-abutting end 322 of the webbing-abutting portion 32 of the adjustment base 30; hence, the webbing height adjusting unit 3 is fixed on a position on the supplementary webbing 2A. The front section of the main webbing 1A is mounted through the main webbing slot 331 of the webbing-mounting portion 33 of the adjuster base 30 to form the above-mentioned top position.

In the description above, the webbing height adjusting unit 3 is fixed on a position on the supplementary webbing 2A, and the main webbing 1A is guided by the webbing height adjusting unit 3 and is configured to move freely relative to the webbing height adjusting unit 3. The front section 12A of the main webbing 1A securing the shoulder and the chest of the occupant is redirected by the bottom wall of the webbing-mounting portion 33, which reduces discomfort of the occupant secured by the main webbing 1A.

Operation of adjusting the height position of the webbing height adjusting unit 3 (forming the top position) is shown in FIGS. 1, 4, 22, 23, 24A, and 24B. When trying to adjust the webbing height adjusting unit 3 higher, the occupant holds and moves the outer shell 60 to push the adjuster base 30 upward (specifically, the two abutting portions 60C abut and push the webbing-abutting portion 32) such that the adjuster base 30 moves relatively to the slider 40 to unclamp the supplementary webbing 2A, which allows the height position of the webbing height adjusting unit 3 to be adjusted along the supplementary webbing 2A and the front section 12A of the main webbing 1A. After adjusting the webbing height adjusting unit 3 to a proper height position, the occupant releases the outer shell 60, and the restoring force of the elastic member 50 pushes the adjuster base 30 and the slider 40 to re-clamp the supplementary webbing 2A, which fixes the webbing height adjusting unit 3 at the proper height position. The webbing height adjusting unit 3 is thus convenient and simple in operation for the occupant.

With reference to FIGS. 1, 4, 22, 25, and 26, when trying to adjust the webbing height adjusting unit 3 lower, the occupant holds and moves the outer shell 60 to push the slider 40 downward (specifically, the outer shell 60 abuts and pushes the second side board 42 of the slider 40) such that the slider 40 moves relatively to the adjuster base 30 to unclamp the supplementary webbing 2A, which allows the height position of the webbing height adjusting unit 3 to be adjusted along the supplementary webbing 2A and the front section 12A of the main webbing 1A. After adjusting the webbing height adjusting unit 3 to a proper height position, the occupant releases the outer shell 60, and the restoring force of the elastic member 50 pushes the slider 40 and the adjuster base 30 to re-clamp the supplementary webbing 2A, which fixes the webbing height adjusting unit 3 at the proper height position.

With reference to FIGS. 1, 4, 22, 27, and 29, the height position of the webbing height adjusting unit 3 can be operated by other means; e.g. when trying to adjust the webbing height adjusting unit 3 higher or lower, the occupant may also hold the webbing height adjusting unit 3 and press the outer shell 60 and the adjuster base 30 at the same time such that the slider 40 and the adjuster base 30 move relatively to unclamp the supplementary webbing 2A, which allows the occupant to hold and adjust the webbing height adjusting unit 3 downward or upward along the supplementary webbing 2A and the front section 12A of the main webbing 1A. After adjusting the webbing height adjusting unit 3 to a proper height position, the webbing height adjusting unit 3 is released, and the restoring force of the elastic member 50 pushes the slider 40 and the adjuster base 30 to re-clamp the supplementary webbing 2A such that the webbing height adjusting unit 3 is fixed at the proper height position.

With reference to FIGS. 1, 4, and 22, after the occupant is seated on the seat and fastens the main webbing 1A correctly, the supplementary webbing 2A below the D-loop 2C is mounted through a middle of the webbing-abutting portion 32 and the slider 40 from the first side 301 to the second side 302 of the adjuster base 30, and the elastic member 50 pushes the slider 40 and the webbing-abutting portion 32 to clamp the supplementary webbing 2A. The front section 12A of the main webbing 1A is movably mounted through the main webbing slot 331 from the first side 301 to the second side 302 of the adjuster base 30, is redirected by the webbing-mounting portion 33, and then secures the occupant's body on the seat. A retracting force of the webbing retractor 1B acted on the main webbing 1A increases the tension of the main webbing 1A, and the main webbing 1A increases a tension of the supplementary webbing 2A via the webbing height adjusting unit 3. On the basis that the webbing height adjusting unit 3 initiatively clamps the supplementary webbing 2A, as the tension of the supplementary webbing 2A increases, a clamping force acted on the supplementary webbing 2A by the adjuster base 30 and the slider 40 can thus be improved to provide a better positioning effect and to maintain the webbing height adjusting unit 3 at the proper height position. In other words, the clamping force is in a positive correlation with the tension on the main webbing 1A and minimizes the possibility of changing its location.

Figure 30:
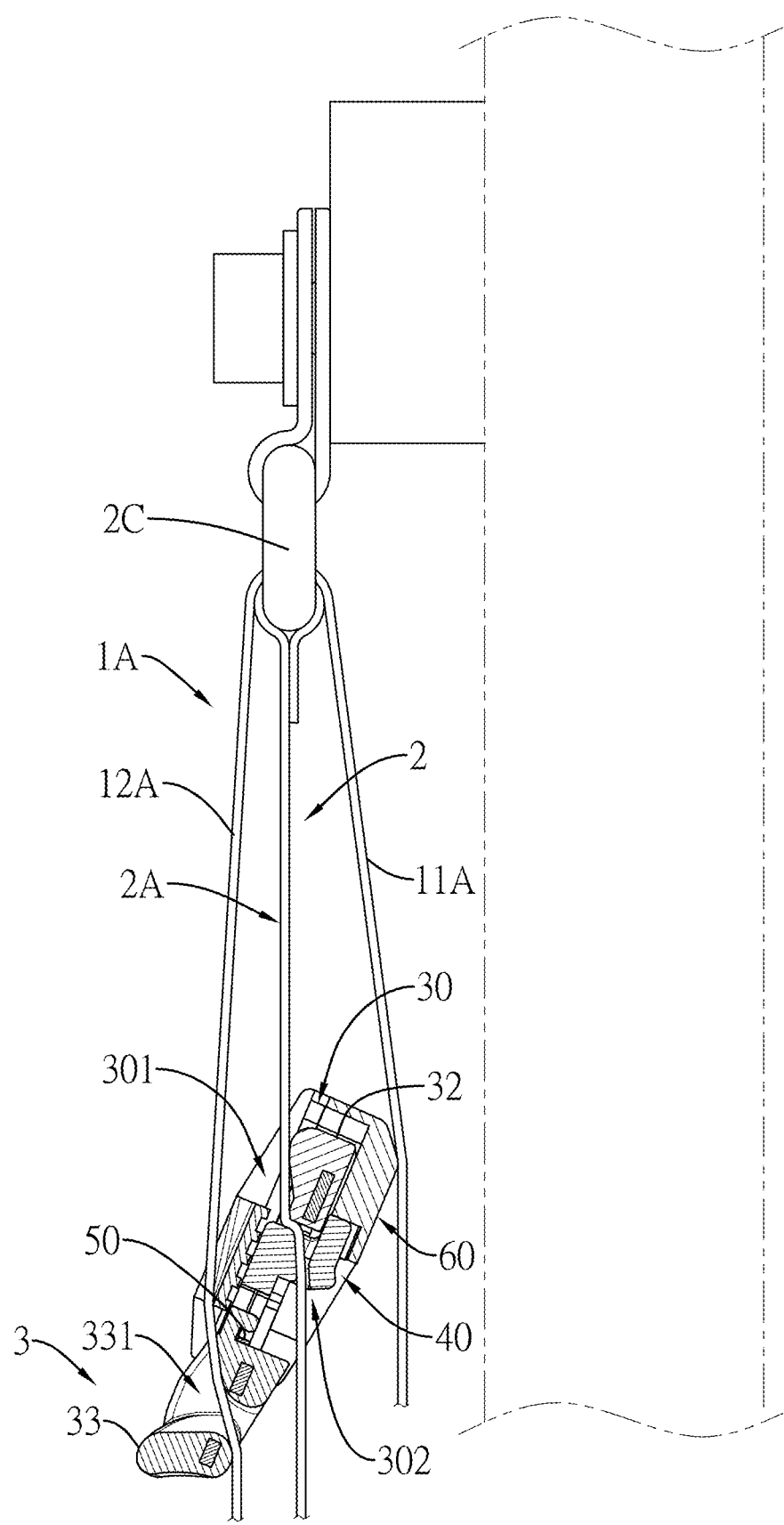
FIG. 30 is a sectional side view of the webbing height adjusting unit of the webbing height adjusting devices in FIGS. 1 and 4 with no occupant on a seat.

With reference to FIG. 30, when no occupant is seated on the seat, the main webbing 1A of the three-point seat belt system is retracted by the webbing retractor 1B to slide relative to the webbing height adjusting unit 3 along the main webbing slot 331 and the D-loop 2C; the webbing height adjusting unit 3 keeps clamping the supplementary webbing 2A via the adjuster base 30 and the slider 40 pressed by the elastic member 50, which allows the webbing height adjusting unit 3 to be maintained at the proper height position after adjustment. Thereby, if the occupant leaves the seat after adjusting the webbing height adjusting unit 3 and the webbing height adjusting unit 3 retains its position without further adjustment by any other occupant, when the same occupant returns and refastens the main webbing 1A to secure the occupant's body on the seat with the front section 12A, the webbing height adjusting unit 3 still maintains the proper height position as previously adjusted; the occupant needs not readjust the webbing height adjusting unit 3.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A webbing height adjusting device adapted to be connected to a main webbing extending out from a webbing retractor of a seat belt system of a vehicle, and the webbing height adjusting device comprising:
 a shock absorbing component having
  a D-loop configured to be connected to an upper position in the vehicle and configured for the main webbing to be mounted therethrough, thereby the D-loop dividing the main webbing to a rear section and a front section;
  a supplementary webbing configured to be located between the rear section and the front section of the main webbing and having
   a top end connected to the D-loop;
   a bottom end being opposite to the top end and configured to be connected to a lower position in the vehicle; and
   at least one flexible section; and
  at least one elastic element located beside said flexible section and having two opposite ends fixed to two opposite ends of said flexible section respectively; and
 a webbing height adjusting unit disposed below the D-loop, configured to be connected to the front section of the main webbing and the supplementary webbing to form an adjustable top position, and having
an adjuster base having
a frame;
a webbing-abutting portion formed on an upper section of the frame; and
a sliding space formed between the webbing-abutting portion and the frame;
a webbing-mounting portion formed on a lower section of the frame; and
a main webbing slot formed in the webbing-mounting portion and the frame and configured for the front section of the main webbing to be mounted therethrough;
a slider mounted in the sliding space of the adjuster base, configured to move up and down, and having an inclined slot configured for the supplementary webbing to be mounted therethrough;
an elastic member disposed between the slider and the adjuster base and configured to provide a restoring force to allow the slider and the webbing-abutting portion of the adjuster base to clamp the supplementary webbing; and
an outer shell mounted on the adjuster base, configured to move up and down relative to the adjuster base, and being operable to actuate the slider and the adjuster base to move relatively so as to unclamp the supplementary webbing;
wherein when the outer shell is released, the restoring force provided by the elastic member pushes the slider and the adjuster base to move relatively and re-clamp the supplementary webbing.

2. The webbing height adjusting device as claimed in claim 1, wherein
the supplementary webbing has one said flexible section located at a lower section of the supplementary webbing; and
the at least one elastic element is located on one of two opposite sides or each one of the two opposite sides of the flexible section.

3. The webbing height adjusting device as claimed in claim 1, wherein the supplementary webbing has two said flexible sections located at an upper section and a lower section of the supplementary webbing, respectively; and
each one of the two flexible sections has at least one said elastic element located on one of two opposite sides or each one of the two opposite sides of said flexible section.

4. The webbing height adjusting device as claimed in claim 1, wherein
the outer shell has
an operation space formed on an upper section of an interior of the outer shell; and
two abutting portions located below two opposite sides of the operation space respectively;
the webbing-abutting portion of the adjuster base is configured to move up and down in the operation space and is located above the two abutting portions;
the outer shell is configured to be pulled upward and to push the webbing-abutting portion of the adjuster base via the two abutting portions to actuate the adjuster base and the slider to move relatively; and
the outer shell is operable to move downward, to abut the slider, and to allow the adjuster base and the slider to move relatively.

5. The webbing height adjusting device as claimed in claim 2, wherein the outer shell has
an operation space formed on an upper section of an interior of the outer shell; and
two abutting portions located below two opposite sides of the operation space respectively;
the webbing-abutting portion of the adjuster base is configured to move up and down in the operation space and is located above the two abutting portions;
the outer shell is configured to be pulled upward and to push the webbing-abutting portion of the adjuster base via the two abutting portions to actuate the adjuster base and the slider to move relatively; and
the outer shell is operable to move downward, to abut the slider, and to allow the adjuster base and the slider to move relatively.

6. The webbing height adjusting device as claimed in claim 3, wherein
the outer shell has
an operation space formed on an upper section of an interior of the outer shell; and
two abutting portions located below two opposite sides of the operation space respectively;
the webbing-abutting portion of the adjuster base is configured to move up and down in the operation space and is located above the two abutting portions;
the outer shell is configured to be pulled upward and to push the webbing-abutting portion of the adjuster base via the two abutting portions to actuate the adjuster base and the slider to move relatively; and
the outer shell is operable to move downward, to abut the slider, and to allow the adjuster base and the slider to move relatively.

7. The webbing height adjusting device as claimed in claim 4, wherein
the adjuster base has two opposite sides being a first side and a second side respectively;
the second side of the adjuster base is configured to face the rear section of the main webbing;
the adjuster base is configured for the front section of the main webbing and the supplementary webbing to extend thereinto from the first side of the adjuster base and to extend thereout from the second side of the adjuster base;
an end of the webbing-abutting portion near the sliding space forms a webbing-abutting end;
the slider has
a first side board and a second side board arranged at a spaced interval and located at the first side and the second side of the adjuster base, respectively; and
two connecting portions formed between the first side board and the second side board and located through the sliding space of the adjuster base;
the inclined slot inclinedly extends between the two connecting portions along a direction from an end of the first side board near the webbing-abutting portion toward an end of the second side board near the webbing-mounting portion;
a top end of the second side board is located higher than a top end of the first side board and a top opening of the inclined slot; and
the first side board has a clamping surface formed on an end of the first side board near the inclined slot and configured to clamp the supplementary webbing with the webbing-abutting end of the webbing-abutting portion.

8. The webbing height adjusting device as claimed in claim 5, wherein the adjuster base has two opposite sides being a first side and a second side respectively;

the second side of the adjuster base is configured to face the rear section of the main webbing;

the adjuster base is configured for the front section of the main webbing and the supplementary webbing to extend thereinto from the first side of the adjuster base and to extend thereout from the second side of the adjuster base;

an end of the webbing-abutting portion near the sliding space forms a webbing-abutting end;

the slider has
a first side board and a second side board arranged at a spaced interval and located at the first side and the second side of the adjuster base, respectively; and
two connecting portions formed between the first side board and the second side board and located through the sliding space of the adjuster base;

the inclined slot inclinedly extends between the two connecting portions along a direction from an end of the first side board near the webbing-abutting portion toward an end of the second side board near the webbing-mounting portion;

a top end of the second side board is located higher than a top end of the first side board and a top opening of the inclined slot; and the first side board has a clamping surface formed on an end of the first side board near the inclined slot and configured to clamp the supplementary webbing with the webbing-abutting end of the webbing-abutting portion.

9. The webbing height adjusting device as claimed in claim 6, wherein the adjuster base has two opposite sides being a first side and a second side respectively;

the second side of the adjuster base is configured to face the rear section of the main webbing;

the adjuster base is configured for the front section of the main webbing and the supplementary webbing to extend thereinto from the first side of the adjuster base and to extend thereout from the second side of the adjuster base;

an end of the webbing-abutting portion near the sliding space forms a webbing-abutting end;

the slider has
a first side board and a second side board arranged at a spaced interval and located at the first side and the second side of the adjuster base, respectively; and
two connecting portions formed between the first side board and the second side board and located through the sliding space of the adjuster base;

the inclined slot inclinedly extends between the two connecting portions along a direction from an end of the first side board near the webbing-abutting portion toward an end of the second side board near the webbing-mounting portion;

a top end of the second side board is located higher than a top end of the first side board and a top opening of the inclined slot; and the first side board has a clamping surface formed on an end of the first side board near the inclined slot and configured to clamp the supplementary webbing with the webbing-abutting end of the webbing-abutting portion.

10. The webbing height adjusting device as claimed in claim 7, wherein the frame has a through hole and a connecting hole located below the through hole;

the webbing-abutting portion is formed to cover the upper section of the frame and extends to a top end of the through hole;

the sliding space is formed between an edge of the through hole and the webbing-abutting portion; and the webbing-mounting portion is formed to cover the lower section of the frame and covers the connecting hole to form the main webbing slot.

11. The webbing height adjusting device as claimed in claim 8, wherein the frame has a through hole and a connecting hole located below the through hole;

the webbing-abutting portion is formed to cover the upper section of the frame and extends to a top end of the through hole;

the sliding space is formed between an edge of the through hole and the webbing-abutting portion; and the webbing-mounting portion is formed to cover the lower section of the frame and covers the connecting hole to form the main webbing slot.

12. The webbing height adjusting device as claimed in claim 9, wherein the frame has a through hole and a connecting hole located below the through hole;

the webbing-abutting portion is formed to cover the upper section of the frame and extends to a top end of the through hole;

the sliding space is formed between an edge of the through hole and the webbing-abutting portion; and the webbing-mounting portion is formed to cover the lower section of the frame and covers the connecting hole to form the main webbing slot.

13. The webbing height adjusting device as claimed in claim 10, wherein the webbing-mounting portion has
an abutting surface formed on a top of the webbing-mounting portion; and
a position-limiting post protruding from the abutting surface and laterally extending toward the frame to form a gap between the position-limiting post and the abutting surface; and the elastic member is an arc-shaped flat spring and has
a middle portion disposed in the gap between the position-limiting post and the abutting surface; and
two end portions connected to the middle portion and abutting a bottom of the first side board of the slider.

14. The webbing height adjusting device as claimed in claim 11, wherein the webbing-mounting portion has
an abutting surface formed on a top of the webbing-mounting portion; and
a position-limiting post protruding from the abutting surface and laterally extending toward the frame to form a gap between the position-limiting post and the abutting surface; and the elastic member is an arc-shaped flat spring and has
a middle portion disposed in the gap between the position-limiting post and the abutting surface; and
two end portions connected to the middle portion and abutting a bottom of the first side board of the slider.

15. The webbing height adjusting device as claimed in claim 12, wherein the webbing-mounting portion has
an abutting surface formed on a top of the webbing-mounting portion; and a position-limiting post protruding from the abutting surface and laterally extending toward the frame to form a gap between the position-limiting post and the abutting surface; and the elastic member is an arc-shaped flat spring and has
a middle portion disposed in the gap between the position-limiting post and the abutting surface; and
two end portions connected to the middle portion and abutting a bottom of the first side board of the slider.

16. The webbing height adjusting device as claimed in claim 7, wherein
the outer shell has
a first plate portion located beside the second side of the adjuster base and abutting against a top of the second side board of the slider;
a second plate portion located beside the first side of the adjuster base;
a top side wall connected to a top end of the first plate portion, located beside the webbing-abutting portion of the adjuster base, located above the operation space, and having a side surface facing the operation space; and
a webbing-mounting space formed between the second plate portion and the top side wall and communicating with the sliding space from the first side of the adjuster base; and
an operation gap is formed between the side surface of the top side wall and the webbing-abutting portion.

17. The webbing height adjusting device as claimed in claim 8, wherein
the outer shell has
a first plate portion located beside the second side of the adjuster base and abutting against a top of the second side board of the slider;
a second plate portion located beside the first side of the adjuster base;
a top side wall connected to a top end of the first plate portion, located beside the webbing-abutting portion of the adjuster base, located above the operation space, and having a side surface facing the operation space; and
a webbing-mounting space formed between the second plate portion and the top side wall and communicating with the sliding space from the first side of the adjuster base; and
an operation gap is formed between the side surface of the top side wall and the webbing-abutting portion.

18. The webbing height adjusting device as claimed in claim 9, wherein
the outer shell has
a first plate portion located beside the second side of the adjuster base and abutting against a top of the second side board of the slider;
a second plate portion located beside the first side of the adjuster base;
a top side wall connected to a top end of the first plate portion, located beside the webbing-abutting portion of the adjuster base, located above the operation space, and having a side surface facing the operation space; and
a webbing-mounting space formed between the second plate portion and the top side wall and communicating with the sliding space from the first side of the adjuster base; and
an operation gap is formed between the side surface of the top side wall and the webbing-abutting portion.

19. The webbing height adjusting device as claimed in claim 16, wherein the outer shell has
two side walls located on two opposite sides of the outer shell respectively, connected to the second plate portion and the first plate portion, and each one of the two side walls having a slip-proof surface on its periphery; and
a receiving groove formed by the first plate portion and the two side walls and configured for the second side board of the slider to be inserted thereinto.

20. The webbing height adjusting device as claimed in claim 17, wherein the outer shell has
two side walls located on two opposite sides of the outer shell respectively, connected to the second plate portion and the first plate portion, and each one of the two side walls having a slip-proof surface on its periphery; and
a receiving groove formed by the first plate portion and the two side walls and configured for the second side board of the slider to be inserted thereinto.

21. The webbing height adjusting device as claimed in claim 18, wherein the outer shell has
two side walls located on two opposite sides of the outer shell respectively, connected to the second plate portion and the first plate portion, and each one of the two side walls having a slip-proof surface on its periphery; and
a receiving groove formed by the first plate portion and the two side walls and configured for the second side board of the slider to be inserted thereinto.

22. The webbing height adjusting device as claimed in claim 16, wherein
the outer shell has a bridge portion connected to the second plate portion and forming a space between the bridge portion and the second plate portion; and
the main webbing is mounted through the space between the bridge portion and the second plate portion and then mounted through the main webbing slot of the adjuster base.

23. The webbing height adjusting device as claimed in claim 17, wherein
the outer shell has a bridge portion connected to the second plate portion and forming a space between the bridge portion and the second plate portion; and
the main webbing is mounted through the space between the bridge portion and the second plate portion and then mounted through the main webbing slot of the adjuster base.

24. The webbing height adjusting device as claimed in claim 18, wherein
the outer shell has a bridge portion connected to the second plate portion and forming a space between the bridge portion and the second plate portion; and
the main webbing is mounted through the space between the bridge portion and the second plate portion and then mounted through the main webbing slot of the adjuster base.

25. A webbing height adjusting device adapted to be connected to a main webbing extending out from a webbing retractor of a seat belt system of a vehicle, and the webbing height adjusting device comprising:
a shock absorbing component having
a D-loop configured to be connected to an upper position in the vehicle and configured for the main webbing to be mounted therethrough, thereby the D-loop dividing the main webbing to a rear section and a front section;
a supplementary webbing configured to be located between the rear section and the front section of the main webbing and having a top end connected to the D-loop; and
a bottom end opposite to the top end;
an elastic element connected to the bottom end of the supplementary webbing and having a bottom configured to be connected to a lower position in the vehicle; and
a webbing height adjusting unit disposed below the D-loop, configured to be connected to the front section of the main webbing and the supplementary webbing to form an adjustable top position, and having
an adjuster base having
a frame;
a webbing-abutting portion formed on an upper section of the frame; and
a sliding space formed between the webbing-abutting portion and the frame;
a webbing-mounting portion formed on a lower section of the frame; and
a main webbing slot formed in the webbing-mounting portion and the frame and configured for the front section of the main webbing to be mounted therethrough;
a slider mounted in the sliding space of the adjuster base, configured to move up and down, and having an inclined slot configured for the supplementary webbing to be mounted therethrough;
an elastic member disposed between the slider and the adjuster base and configured to provide a restoring force to allow the slider and the webbing-abutting portion of the adjuster base to clamp the supplementary webbing; and
an outer shell mounted on the adjuster base, configured to move up and down relative to the adjuster base, and being operable to actuate the slider and the adjuster base to move relatively so as to unclamp the supplementary webbing;
wherein when the outer shell is released, the restoring force provided by the elastic member pushes the slider and the adjuster base to move relatively and re-clamp the supplementary webbing.

26. The webbing height adjusting device as claimed in claim 25, wherein
the outer shell has
an operation space formed on an upper section of an interior of the outer shell; and
two abutting portions located below two opposite sides of the operation space respectively;
the webbing-abutting portion of the adjuster base is configured to move up and down in the operation space and is located above the two abutting portions;
the outer shell is configured to be pulled upward and to push the webbing-abutting portion of the adjuster base via the two abutting portions to actuate the adjuster base and the slider to move relatively; and
the outer shell is operable to move downward, to abut the slider, and to allow the adjuster base and the slider to move relatively.

27. The webbing height adjusting device as claimed in claim 26, wherein
the adjuster base has two opposite sides being a first side and a second side respectively;
the second side of the adjuster base is configured to face the rear section of the main webbing;
the adjuster base is configured for the front section of the main webbing and the supplementary webbing to extend thereinto from the first side of the adjuster base and to extend thereout from the second side of the adjuster base;
an end of the webbing-abutting portion near the sliding space forms a webbing-abutting end;
the slider has
a first side board and a second side board arranged at a spaced interval and located at the first side and the second side of the adjuster base, respectively; and
two connecting portions formed between the first side board and the second side board and located through the sliding space of the adjuster base;
the inclined slot inclinedly extends between the two connecting portions along a direction from an end of the first side board near the webbing-abutting portion toward an end of the second side board near the webbing-mounting portion;
a top end of the second side board is located higher than a top end of the first side board and a top opening of the inclined slot; and
the first side board has a clamping surface formed on an end of the first side board near the inclined slot and configured to clamp the supplementary webbing with the webbing-abutting end of the webbing-abutting portion.

28. The webbing height adjusting device as claimed in claim 27, wherein
the frame has a through hole and a connecting hole located below the through hole;
the webbing-abutting portion is formed to cover the upper section of the frame and extends to a top end of the through hole;
the sliding space is formed between an edge of the through hole and the webbing-abutting portion; and
the webbing-mounting portion is formed to cover the lower section of the frame and covers the connecting hole to form the main webbing slot.

29. The webbing height adjusting device as claimed in claim 28, wherein
the webbing-mounting portion has
an abutting surface formed on a top of the webbing-mounting portion; and
a position-limiting post protruding from the abutting surface and laterally extending toward the frame to form a gap between the position-limiting post and the abutting surface; and
the elastic member is an arc-shaped flat spring and has
a middle portion disposed in the gap between the position-limiting post and the abutting surface; and
two end portions connected to the middle portion and abutting a bottom of the first side board of the slider.

30. The webbing height adjusting device as claimed in claim 27, wherein
the outer shell has
a first plate portion located beside the second side of the adjuster base and abutting against a top of the second side board of the slider;
a second plate portion located beside the first side of the adjuster base;
a top side wall connected to a top end of the first plate portion, located beside the webbing-abutting portion of the adjuster base, located above the operation space, and having a side surface facing the operation space; and a webbing-mounting space formed between the second plate portion and the top side wall and communicating with the sliding space from the first side of the adjuster base; and an operation gap is formed between the side surface of the top side wall and the webbing-abutting portion.

31. The webbing height adjusting device as claimed in claim 30, wherein the outer shell has two side walls located on two opposite sides of the outer shell respectively, connected to the second plate portion and the first plate portion, and each one of the two side walls having a slip-proof surface on its periphery; and a receiving groove formed by the first plate portion and the two side walls and configured for the second side board of the slider to be inserted thereinto.

32. The webbing height adjusting device as claimed in claim 30, wherein the outer shell has a bridge portion connected to the second plate portion and forming a space between the bridge portion and the second plate portion; and the main webbing is mounted through the space between the bridge portion and the second plate portion and then mounted through the main webbing slot of the adjuster base.

33. A webbing height adjusting device adapted to be connected to a main webbing extending out from a webbing retractor of a seat belt system of a vehicle, and the webbing height adjusting device comprising:

a shock absorbing component having a D-loop configured to be connected to an upper position in the vehicle and configured for the main webbing to be mounted therethrough, thereby the D-loop dividing the main webbing to a rear section and a front section;

a supplementary webbing having a bottom end and a top end being opposite to each other; and two elastic elements, one of the two elastic elements connected to the D-loop and the top end of the supplementary webbing, and the other one of the two elastic elements connected to the bottom end of the supplementary webbing and configured to be connected to a lower position of the vehicle;

a webbing height adjusting unit disposed below the D-loop, configured to be connected to the front section of the main webbing and the supplementary webbing to form an adjustable top position, and having an adjuster base having a frame;

a webbing-abutting portion formed on an upper section of the frame; and a sliding space formed between the webbing-abutting portion and the frame;

a webbing-mounting portion formed on a lower section of the frame; and a main webbing slot formed in the webbing-mounting portion and the frame and configured for the front section of the main webbing to be mounted therethrough;

a slider mounted in the sliding space of the adjuster base, configured to move up and down, and having an inclined slot configured for the supplementary webbing to be mounted therethrough;

an elastic member disposed between the slider and the adjuster base and configured to provide a restoring force to allow the slider and the webbing-abutting portion of the adjuster base to clamp the supplementary webbing; and an outer shell mounted on the adjuster base, configured to move up and down relative to the adjuster base, and being operable to actuate the slider and the adjuster base to move relatively so as to unclamp the supplementary webbing;

wherein when the outer shell is released, the restoring force provided by the elastic member pushes the slider and the adjuster base to move relatively and re-clamp the supplementary webbing.

34. The webbing height adjusting device as claimed in claim 33, wherein the outer shell has an operation space formed on an upper section of an interior of the outer shell; and two abutting portions located below two opposite sides of the operation space respectively;

the webbing-abutting portion of the adjuster base is configured to move up and down in the operation space and is located above the two abutting portions;

the outer shell is configured to be pulled upward and to push the webbing-abutting portion of the adjuster base via the two abutting portions to actuate the adjuster base and the slider to move relatively; and the outer shell is operable to move downward, to abut the slider, and to allow the adjuster base and the slider to move relatively.

35. The webbing height adjusting device as claimed in claim 34, wherein the adjuster base has two opposite sides being a first side and a second side respectively;

the second side of the adjuster base is configured to face the rear section of the main webbing;

the adjuster base is configured for the front section of the main webbing and the supplementary webbing to extend thereinto from the first side of the adjuster base and to extend thereout from the second side of the adjuster base;

an end of the webbing-abutting portion near the sliding space forms a webbing-abutting end;

the slider has a first side board and a second side board arranged at a spaced interval and located at the first side and the second side of the adjuster base, respectively; and two connecting portions formed between the first side board and the second side board and located through the sliding space of the adjuster base;

the inclined slot inclinedly extends between the two connecting portions along a direction from an end of the first side board near the webbing-abutting portion toward an end of the second side board near the webbing-mounting portion;

a top end of the second side board is located higher than a top end of the first side board and a top opening of the inclined slot; and the first side board has a clamping surface formed on an end of the first side board near the inclined slot and configured to clamp the supplementary webbing with the webbing-abutting end of the webbing-abutting portion.

36. The webbing height adjusting device as claimed in claim 35, wherein the frame has a through hole and a connecting hole located below the through hole;

the webbing-abutting portion is formed to cover the upper section of the frame and extends to a top end of the through hole;

the sliding space is formed between an edge of the through hole and the webbing-abutting portion; and the webbing-mounting portion is formed to cover the lower section of the frame and covers the connecting hole to form the main webbing slot.

37. The webbing height adjusting device as claimed in claim 36, wherein the webbing-mounting portion has an abutting surface formed on a top of the webbing-mounting portion; and a position-limiting post protruding from the abutting surface and laterally extending toward the frame to form a gap between the position-limiting post and the abutting surface; and the elastic member is an arc-shaped flat spring and has a middle portion disposed in the gap between the position-limiting post and the abutting surface; and two end portions connected to the middle portion and abutting a bottom of the first side board of the slider.

38. The webbing height adjusting device as claimed in claim 35, wherein the outer shell has a first plate portion located beside the second side of the adjuster base and abutting against a top of the second side board of the slider;

a second plate portion located beside the first side of the adjuster base;

a top side wall connected to a top end of the first plate portion, located beside the webbing-abutting portion of the adjuster base, located above the operation space, and having a side surface facing the operation space; and a webbing-mounting space formed between the second plate portion and the top side wall and communicating with the sliding space from the first side of the adjuster base; and an operation gap is formed between the side surface of the top side wall and the webbing-abutting portion.

39. The webbing height adjusting device as claimed in claim 38, wherein the outer shell has two side walls located on two opposite sides of the outer shell respectively, connected to the second plate portion and the first plate portion, and each one of the two side walls having a slip-proof surface on its periphery; and a receiving groove formed by the first plate portion and the two side walls and configured for the second side board of the slider to be inserted thereinto.

40. The webbing height adjusting device as claimed in claim 38, wherein the outer shell has a bridge portion connected to the second plate portion and forming a space between the bridge portion and the second plate portion; and the main webbing is mounted through the space between the bridge portion and the second plate portion and then mounted through the main webbing slot of the adjuster base.

* * * * *